United States Patent
Jiang

(10) Patent No.: US 11,749,867 B1
(45) Date of Patent: Sep. 5, 2023

(54) METHOD FOR REMOTELY SOLVING THERMAL RUNAWAY AND RELATED PRODUCTS

(71) Applicants: Shenzhen Hairun New Energy Technology Co., Ltd., Guangdong (CN); Xiamen Hithium Energy Storage Technology Co., Ltd., Fujian (CN)

(72) Inventor: Huaiyu Jiang, Guangdong (CN)

(73) Assignees: Shenzhen Hairun New Energy Technology Co., Ltd., Guangdong (CN); Xiamen Hithium Energy Storage Technology Co., Ltd., Fujian (CN)

(*) Notice: Subject to any disclaimer, the term of this patent is extended or adjusted under 35 U.S.C. 154(b) by 0 days.

(21) Appl. No.: 18/193,688

(22) Filed: Mar. 31, 2023

(30) Foreign Application Priority Data

Nov. 29, 2022 (CN) .......................... 202211507855.4

(51) Int. Cl.
*H01M 50/383* (2021.01)
*A62C 3/16* (2006.01)
*G05B 15/02* (2006.01)

(52) U.S. Cl.
CPC ............. *H01M 50/383* (2021.01); *A62C 3/16* (2013.01); *G05B 15/02* (2013.01)

(58) Field of Classification Search
CPC ......... H01M 50/383; A62C 3/16; G05B 15/02
See application file for complete search history.

(56) References Cited

U.S. PATENT DOCUMENTS

| | | | | |
|---|---|---|---|---|
| 9,537,332 | B2* | 1/2017 | Cotton | H02J 7/00712 |
| 9,577,443 | B2* | 2/2017 | Gach | G01R 31/382 |
| 10,440,542 | B2* | 10/2019 | Thomas | H04W 4/80 |
| 10,684,330 | B2* | 6/2020 | Karner | G06F 3/0484 |
| 10,814,776 | B2* | 10/2020 | Fay | B60Q 1/2696 |
| 11,208,876 | B2* | 12/2021 | Eslinger | E21B 43/121 |
| 11,447,015 | B1* | 9/2022 | Wiegman | B60L 50/60 |
| 2015/0143806 | A1* | 5/2015 | Friesth | F01K 13/02 |
| | | | | 220/592.2 |

(Continued)

OTHER PUBLICATIONS

CNIPA, Notification to Grant Patent Right for Invention for Chinese Patent Application No. 202211507855.4, dated Jan. 11, 2023, 3 pages.

*Primary Examiner* — Ramesh B Patel
(74) *Attorney, Agent, or Firm* — IP Spring

(57) ABSTRACT

A method for remotely solving thermal runaway and related products are provided in implementations of the disclosure. The method is applied to a user terminal in a system for remotely solving thermal runaway, and include the following. At least one monitoring datum transmitted by at least one monitoring terminal and related to at least one energy-storage device is received at a preset frequency. When at least one of the at least one monitoring datum is greater than a threshold, an energy-storage device related to the at least one of the at least one monitoring datum is determined as a target energy-storage device. An accident type of the target energy-storage device is determined according to the at least one of the at least one monitoring datum, a first prompt message is generated, and the first prompt message is presented to a user in multiple manners.

20 Claims, 5 Drawing Sheets

(56) References Cited

U.S. PATENT DOCUMENTS

| | | | |
|---|---|---|---|
| 2018/0003572 A1* | 1/2018 | Garsd | G01K 13/00 |
| 2019/0036178 A1* | 1/2019 | Karner | H02J 13/00002 |
| 2022/0170388 A1* | 6/2022 | O'Donnell | C25B 9/23 |
| 2022/0349948 A1* | 11/2022 | Kowalski | G01R 31/392 |
| 2023/0138942 A1* | 5/2023 | Churchill | G07C 5/008 |
| | | | 701/31.4 |

* cited by examiner

METHOD FOR REMOTELY SOLVING THERMAL RUNAWAY AND RELATED PRODUCTS

CROSS-REFERENCE TO RELATED APPLICATION(S)

This application claims priority under 35 U.S.C. § 119(a) to and the benefit of Chinese Patent Application No. 202211507855.4, filed Nov. 29, 2022, the disclosure of which is hereby incorporated by reference in its entirety.

TECHNICAL FIELD

This disclosure relates to the field of new energy, and particularly to a method for remotely solving thermal runaway and related products.

BACKGROUND

Although a lithium ion battery is stable, and a failure caused by a self-induction of the battery is less likely to happen, the lithium ion battery generally induces thermal runaway due to a thermal abuse, an electrical abuse, and a mechanical abuse etc. After the battery enters a state of the thermal runaway, the process of the thermal runaway is irreversible without an external intervention, and an internal temperature of the battery will rise continuously. As a result, electrolytes and electrode materials are decomposed due to the heat, flammable and harmful gases are produced, and various physical and chemical reactions inside the battery are further intensified, which will lead to combustion or even an explosion. Therefore, a staff needs to closely observe a working state of the battery to avoid an accident. When the accident occurs, since the battery burns very fast, and the harmful gas generated from the combustion may cause irreversible damages to the staff, the staff is unable to control the fire of the battery in a close distance. Thus, how to provide a safe and easy-to-operate method for solving the thermal runaway for the staff is to be solved by those of ordinary skill in the art.

SUMMARY

In a first aspect of implementations in the disclosure, a method for remotely solving thermal runaway is provided, which is applied to a user terminal in a system for remotely solving thermal runaway. The system for remotely solving the thermal runaway includes the user terminal, at least one monitoring terminal, multiple thermal-runaway solving devices, and at least one energy-storage device. The method can include the following.

At least one monitoring datum transmitted by the at least one monitoring terminal and related to the at least one energy-storage device is received at a preset frequency. The monitoring datum may include monitoring video information, a concentration of a target-gas, and temperature and luminance information, where the target-gas may include at least one of carbon monoxide, hydrogen, methane, or propane. When at least one of the at least one monitoring datum is greater than a threshold, an energy-storage device related to the at least one of the at least one monitoring datum is determined as a target energy-storage device. An accident type of the target energy-storage device is determined according to the at least one of the at least one monitoring datum, a first prompt message is generated, and the first prompt message is presented to a user in at least one manner, where the at least one manner may include controlling the user terminal to vibrate, controlling the user terminal to play a preset audio, and controlling the user terminal to present a prompting popup window, and the first prompt message can be used for prompting existence of a potential safety hazard in the target energy-storage device and the accident type of the target energy-storage device. A corresponding first preset thermal-runaway solution is determined according to the target energy-storage device and the accident type of the target energy storage, and at least one first thermal-runaway solving device among the multiple thermal-runaway solving devices is controlled to solve thermal runaway for the target energy-storage device, according to the first preset thermal-runaway solution, where the first thermal-runaway solving device may correspond to the target energy-storage device and the accident type of the target energy-storage device. In response to a thermal-runaway solution switching instruction inputted by the user via the user terminal, the first preset thermal-runaway solution is switched to a second preset thermal-runaway solution, and at least one second thermal-runaway solving device among the multiple thermal-runaway solving devices is controlled to solve the thermal runaway for the target energy-storage device, according to the second preset thermal-runaway solution, where the second preset thermal-runaway solution is related to the thermal-runaway solution switching instruction, and the second thermal-runaway solving device may correspond to the target energy-storage device and an accident type determined by the user. In response to a thermal-runaway solution adding instruction inputted by the user via the user terminal, the at least one first thermal-runaway solving device and at least one third thermal-runaway solving device among the multiple thermal-runaway solving devices are controlled to solve the thermal runaway for the target energy-storage device, according to the first preset thermal-runaway solution and a third preset thermal-runaway solution, where the third preset thermal-runaway solution is related to the thermal-runaway solution adding instruction, and the third thermal-runaway solving device may correspond to the target energy-storage device and the accident type of the target energy-storage device, or correspond to the accident type determined by the user. In response to a thermal-runaway solution setting instruction inputted by the user via the user terminal, a temporary thermal-runaway solution is generated, and at least one fourth thermal-runaway solving device among the multiple thermal-runaway solving devices is controlled to solve the thermal runaway for the target energy-storage device, according to the temporary thermal-runaway solution, where the temporary thermal-runaway solution is related to the thermal-runaway solution setting instruction, the thermal-runaway solution setting instruction can be used for setting at least one of a type, a quantity, or a position of the at least one fourth thermal-runaway solving device, and the fourth thermal-runaway solving device may correspond to the target energy-storage device and the accident type determined by the user.

In a second aspect of implementations in the disclosure, a user terminal is provided. The user terminal may include a processor, a memory, and a bus. The processor and the memory are connected through the bus, the memory is configured to store a set of program codes, and the processor is configured to invoke the program codes stored in the memory to execute the method described in the first aspect.

In a third aspect of implementations in the disclosure, a non-transitory computer-readable storage medium is provided. The computer-readable storage medium is configured to store instructions which, when executed by a user terminal, implement the method described in the first aspect.

BRIEF DESCRIPTION OF THE DRAWINGS

To describe technical solutions of implementations in the disclosure more clearly, the following will give a brief introduction to the accompanying drawings used for describing implementations. Apparently, the accompanying drawings hereinafter described are only some implementations of the disclosure. Based on these drawings, those of ordinary skill in the art can also obtain other drawings without creative effort.

DETAILED DESCRIPTION

Figure 1:
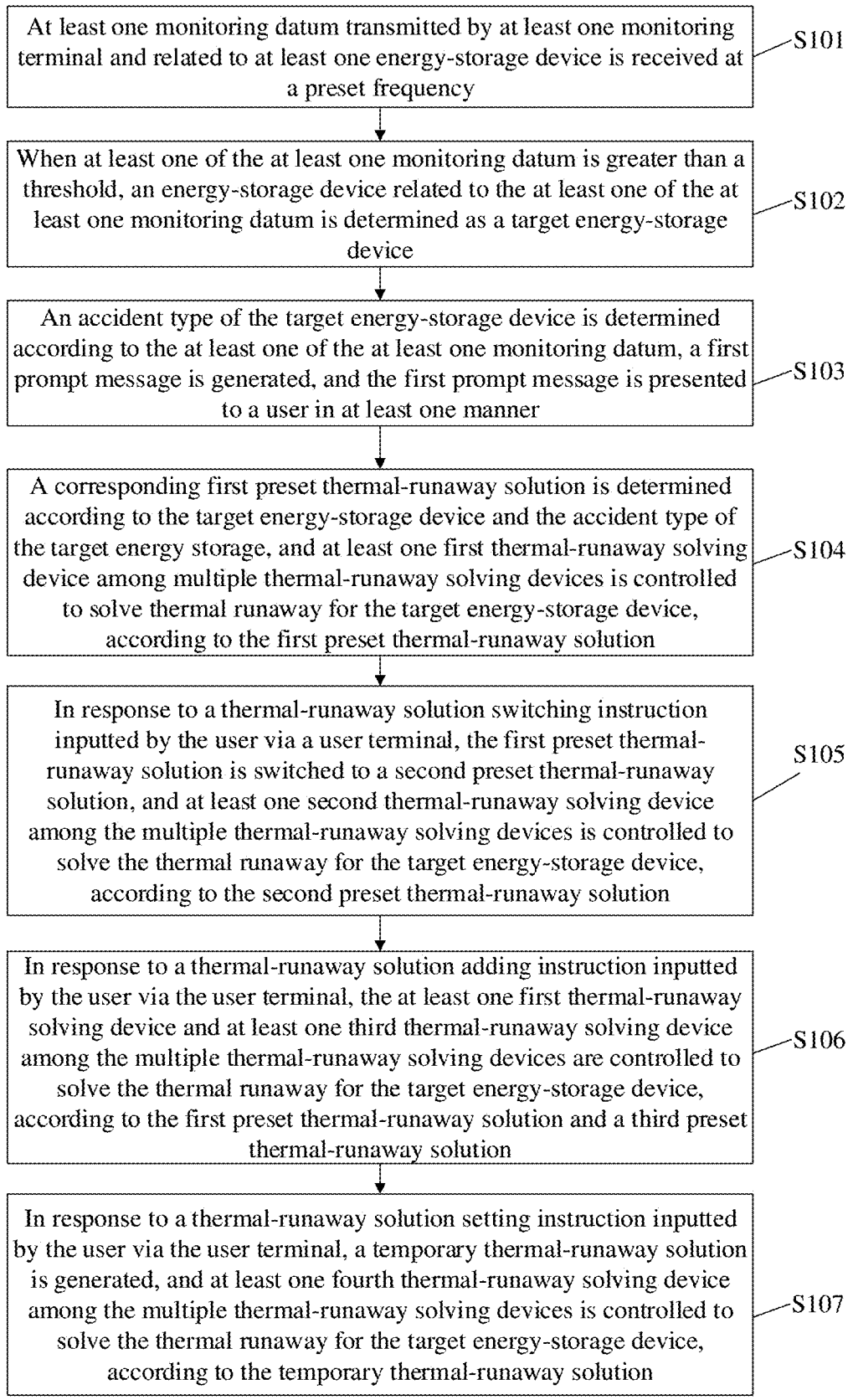
FIG. 1 is a schematic flowchart of a method for remotely solving thermal runaway provided in implementations of the disclosure.

Technical solutions in implementations of the disclosure will be described clearly and comprehensively below with reference to the accompanying drawings in implementations of the disclosure. Apparently, implementations described herein are only some rather than all implementations of the disclosure. Based on implementations in the disclosure, all other implementations obtained by those of ordinary skill in the art without creative effort shall fall within the protection scope of the disclosure.

The terms "first", "second", "third", "fourth" and the like used in the specification and the claims of the disclosure and the above-mentioned accompany drawings are used to distinguish different objects rather than describe a particular order. Additionally, the terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or apparatus can be included.

The term "embodiment" or "implementation" referred to herein means that a particular feature, structure, or feature described in conjunction with the implementation may be contained in at least one implementation of the disclosure. The phrase appearing in various places in the specification does not necessarily refer to the same implementation, nor does it refer to an independent or alternative implementation that is mutually exclusive with other implementations. It is explicitly and implicitly understood by those of ordinary skill in the art that an implementation described herein may be combined with other implementations.

A method for remotely solving thermal runaway is provided in implementations of the disclosure, which enables a user to remotely view a working state and a parameter(s) of an energy-storage device through a user terminal. In addition, in the method of implementations in the disclosure, whether an abnormal situation (such as the thermal runaway) occurs in the energy-storage device is also determined according to a monitoring datum obtained by a monitoring terminal related to the energy-storage device. When the abnormal situation occurs in the energy-storage device, in the method of implementations in the disclosure, corresponding prompt message is generated and transmitted to the user terminal, which is conducive for the user to know the abnormal situation of the energy-storage device in time. Furthermore, in the method of implementations in the disclosure, the user is allowed to solve the thermal runaway for an abnormal energy-storage device through the user terminal, and the user does not need to arrive at an accident scene to direct solving of the thermal-runaway, facilitating ensuring personal safety of the user. In addition, the user can know the abnormal situation of the energy-storage device in more detail and more comprehensively through the user terminal, which is beneficial for the user to design a thermal-runaway solution precisely for the abnormal energy-storage device, thereby improving an efficiency of solving the thermal runaway, and further minimizing losses.

In implementations in the disclosure, a method for remotely solving thermal runaway is provided, which is applied to a user terminal in a system for remotely solving thermal runaway. The system for remotely solving the thermal runaway includes the user terminal, at least one monitoring terminal, multiple thermal-runaway solving devices, and at least one energy-storage device. The method can include the following.

At least one monitoring datum transmitted by the at least one monitoring terminal and related to the at least one energy-storage device is received at a preset frequency. The monitoring datum may include monitoring video information, a concentration of a target-gas, and temperature and luminance information, where the target-gas may include at least one of carbon monoxide, hydrogen, methane, or propane. When at least one of the at least one monitoring datum is greater than a threshold, an energy-storage device related to the at least one of the at least one monitoring datum is determined as a target energy-storage device. An accident type of the target energy-storage device is determined according to the at least one of the at least one monitoring datum, a first prompt message is generated, and the first prompt message is presented to a user in at least one manner, where the at least one manner may include controlling the user terminal to vibrate, controlling the user terminal to play a preset audio, and controlling the user terminal to present a prompting popup window, and the first prompt message can be used for prompting existence of a potential safety hazard in the target energy-storage device and the accident type of the target energy-storage device. A corresponding first preset thermal-runaway solution is determined according to the target energy-storage device and the accident type of the target energy storage, and at least one first thermal-runaway solving device among the multiple thermal-runaway solving devices is controlled to solve thermal runaway for the target energy-storage device, according to the first preset thermal-runaway solution, where the first thermal-runaway solving device may correspond to the target energy-storage device and the accident type of the target energy-storage device. In response to a thermal-runaway solution switching instruction inputted by the user via the user terminal, the first preset thermal-runaway solution is switched to a second preset thermal-runaway solution, and at least one second thermal-runaway solving device among the multiple thermal-runaway solving devices is controlled to solve the thermal runaway for the target energy-storage device, according to the second preset thermal-runaway solution, where the second preset thermal-runaway solution is related to the thermal-runaway solution switching instruction, and the second thermal-runaway solving device may correspond to the target energy-storage device and an accident type determined by the user. In response to a thermal-runaway solution adding instruction inputted by the user via the user terminal, the at least one first thermal-runaway solving device and at least one third thermal-runaway solving device among the multiple thermal-runaway solving devices are controlled to solve the thermal runaway for the target energy-storage device, according to the first preset thermal-runaway solution and a third preset thermal-runaway solution, where the third preset thermal-runaway solution is related to the thermal-runaway solution adding instruction, and the third thermal-runaway solving device may correspond to the target energy-storage device and the accident type of the target energy-storage device, or correspond to the accident type determined by the user. In response to a thermal-runaway solution setting instruction inputted by the user via the user terminal, a temporary thermal-runaway solution is generated, and at least one fourth thermal-runaway solving device among the multiple thermal-runaway solving devices is controlled to solve the thermal runaway for the target energy-storage device, according to the temporary thermal-runaway solution, where the temporary thermal-runaway solution is related to the thermal-runaway solution setting instruction, the thermal-runaway solution setting instruction can be used for setting at least one of a type, a quantity, or a position of the at least one fourth thermal-runaway solving device, and the fourth thermal-runaway solving device may correspond to the target energy-storage device and the accident type determined by the user.

It can be seen that, in the method of implementations in the disclosure, the monitoring datum of the energy-storage device can be transmitted to the user terminal at the preset frequency. When an abnormal situation occurs in the energy-storage device, in the method of implementations in the disclosure, a prompt message can be transmitted to the user in multiple manners, facilitating shortening reaction time of the user and controlling the abnormal situation of the energy-storage device in time. In addition, the user can flexibly set and/or select the thermal-runaway solution, and a determination of the user is considered in addition to an intelligent determination, facilitating obtaining a more suitable and effective thermal-runaway solution, improving an efficiency of solving the accident, and further reducing the losses of the user.

In a possible implementation, the first preset thermal-runaway solution, the second preset thermal-runaway solution, the third preset thermal-runaway solution, and the temporary thermal-runaway solution each can be used for adjusting and controlling at least one of: a spraying speed of a suppression medium, a spraying duration of the suppression medium, a working duration and a rotating speed of an exhaust fan, or a laying manner of a fire-proof and explosion-proof layer. The method of implementations in the disclosure can include the following. After a thermal-runaway solution to-be-implemented is determined by the user terminal, if an implementing duration of the thermal-runaway solution implemented reaches a preset duration and the at least one of the at least one monitoring datum is currently still greater than the threshold, the accident type of the target energy-storage device is re-determined according to the at least one of the at least one monitoring datum, and a second prompt message is presented to the user, where the second prompt message can be used for prompting the user to switch the thermal-runaway solution currently implemented.

As can be seen, according to the method of implementations in the disclosure, in solving the thermal runaway for the target energy-storage device, an effect of solving the thermal runaway for the target energy-storage device is followed up and evaluated (for example, whether a danger level of the target energy-storage device has dropped is determined). For a poor effect of solving the thermal runaway (after solving of the thermal-runaway is performed for the preset duration, the danger level of the target energy-storage device is still greater than a preset value), the user terminal in the method of implementations in the disclosure re-determines the accident type of the target energy-storage device, and determines a corresponding thermal-runaway solution, facilitating solving the thermal runaway for the target energy-storage device more effectively. Furthermore, according to the method of implementations in the disclosure, the user is prompted to change the thermal-runaway solution currently implemented by adjusting the current thermal-runaway solution (with a poor effect of solving the thermal runaway) in time, which is helpful to control the accident scale more effectively.

In another possible implementation, the method of implementations in the disclosure can include the following. In response to a first viewing instruction received by the user terminal, the user terminal displays a list of the at least one energy-storage device. In response to a first selecting instruction received by the user terminal, the user terminal displays at least one first monitoring datum related to a first energy-storage device among the at least one energy-storage device, where the first selecting instruction can be used for selecting the first energy-storage device from the list.

As can be seen, according to the method of implementations in the disclosure, the user is allowed to view an operating state (or working state) of the energy-storage device at any time. The user can view monitoring information corresponding to different energy-storage devices by selecting different energy-storage devices, which is conducive for the user to know the operating state of the energy-storage device in more detail. The user may also identify an energy-storage device that may be faulty by observing the monitoring datum, and check for dangers as early as possible.

In another possible implementation, after the user terminal displays the first monitoring datum related to the first energy-storage device among the at least one energy-storage device, in response to the first selecting instruction received by the user terminal, the method of implementations in the disclosure can further include the following. In response to a switching instruction received by the user terminal, switch from a monitoring terminal that monitors the first energy-storage device to another monitoring terminal that monitors the first energy-storage device. A second monitoring datum collected from the another monitoring terminal and related to the first energy-storage device is displayed.

As can be seen, according to the method of implementations in the disclosure, the user is allowed to switch different monitoring view angles, which is conducive for the user to know the operating state of the energy-storage device in detail and more comprehensively.

In another possible implementation, the method of implementations in the disclosure can include the following. A parameter adjusting instruction received by the user terminal is transmitted to the at least one monitoring terminal and/or at least one of the multiple thermal-runaway solving devices, where the parameter adjusting instruction can be used for setting the threshold and/or a thermal-runaway solving parameter of the at least one of the multiple thermal-runaway solving devices, and the thermal-runaway solving parameter may include a storage capacity of the suppression medium.

As can be seen, according to the method of implementations in the disclosure, the user is allowed to set the preset value related to the danger level and/or the thermal-runaway solving parameter of the thermal-runaway solving device, and the user can design a more suitable evaluation criteria and/or thermal-runaway solution according to working experience, an actual situation, or related knowledge, facilitating improving the efficiency of solving the accident.

In another possible implementation, the method of implementations in the disclosure can further include the following. Alarm information is transmitted to the multiple thermal-runaway solving devices, where the alarm information may include position information of the target energy-storage device and the at least one of the at least one monitoring datum.

As can be seen, according to the method of implementations in the disclosure, when the effect of solving the thermal runaway for the target energy-storage device is poor, the alarm information is transmitted to the thermal-runaway solving devices, which is conducive for a professional (thermal-runaway solving staff) to adopt a more professional thermal-runaway solution to control and eliminate the accident. In addition, the alarm information may include the position information of the target energy-storage device and latest monitoring datum of the target energy-storage device, which is conducive for the professional (thermal-runaway solving staff) to know detailed information about the accident, thereby formulating and adopting a more suitable thermal-runaway solution.

In another possible implementation, the method of implementations in the disclosure can include the following. After a corresponding thermal-runaway solving device is controlled, according to a thermal-runaway solution currently determined, to solve the thermal runaway for the target energy-storage device, if all thermal-runaway solving devices corresponding to the thermal-runaway solution currently determined fail, another disabled thermal-runaway solving device which is of the same type as all thermal-runaway solving devices and corresponds to the target energy-storage device is enabled, where the thermal-runaway solution currently determined may be the first preset thermal-runaway solution, the second preset thermal-runaway solution, the third preset thermal-runaway solution, or the temporary thermal-runaway solution.

As can be seen, in implementations of the disclosure, other suitable thermal-runaway solving devices can be used, according to the working state (a normal working state or an abnormal working state) of the thermal-runaway solving device, to solve the thermal runaway for the target energy-storage device, facilitating ensuring the effect of solving the thermal runaway and reducing the losses of the user.

In implementations in the disclosure, a user terminal is provided. The user terminal may include a communication module, a computation module, a control module, and an interaction module.

The communication module can be configured to receive, at a preset frequency, at least one monitoring datum transmitted by at least one monitoring terminal and related to at least one energy-storage device, where the monitoring datum may include monitoring video information, a concentration of a target-gas, and temperature and luminance information, where the target-gas may include at least one of carbon monoxide, hydrogen, methane, or propane.

The computation module can be configured to determine an energy-storage device related to at least one of the at least one monitoring datum as a target energy-storage device, when the at least one of the at least one monitoring datum is greater than a threshold.

The computation module can be further configured to, when the target energy-storage device exists, determine an accident type of the target energy-storage device according to the at least one of the at least one monitoring datum, and generate a first prompt message, where the first prompt message can be used for prompting existence of a potential safety hazard in the target energy-storage device and the accident type of the target energy-storage device.

The control module can be configured to present the first prompt message to a user in at least one manner, where the at least one manner may include controlling the user terminal to vibrate, controlling the user terminal to play a preset audio, and controlling the user terminal to present a prompting popup window.

The computation module can be further configured to determine, according to the target energy-storage device and the accident type of the target energy storage, a corresponding first preset thermal-runaway solution, in response to a confirmation instruction inputted by the user via the prompting popup window.

The control module can be further configured to control, according to the first preset thermal-runaway solution, at least one first thermal-runaway solving device among the multiple thermal-runaway solving devices to solve thermal runaway for the target energy-storage device, where the first thermal-runaway solving device may correspond to the target energy-storage device and the accident type of the target energy-storage device.

The computation module can be further configured to switch the first preset thermal-runaway solution to a second preset thermal-runaway solution, in response to a thermal-runaway solution switching instruction inputted by the user via the user terminal, where the second preset thermal-runaway solution is related to the thermal-runaway solution switching instruction.

The control module can be further configured to control, according to the second preset thermal-runaway solution, at least one second thermal-runaway solving device among the multiple thermal-runaway solving devices to solve the thermal runaway for the target energy-storage device, where the second thermal-runaway solving device corresponds to the target energy-storage device and an accident type determined by the user.

The control module can be further configured to control, according to the first preset thermal-runaway solution and a third preset thermal-runaway solution, the at least one first thermal-runaway solving device and at least one third thermal-runaway solving device among the multiple thermal-runaway solving devices to solve the thermal runaway for the target energy-storage device, in response to a thermal-runaway solution adding instruction inputted by the user via the user terminal, where the third preset thermal-runaway solution is related to the thermal-runaway solution adding instruction, and the third thermal-runaway solving device may correspond to the target energy-storage device and the accident type of the target energy-storage device, or correspond to the accident type determined by the user.

The control module can be further configured to generate a temporary thermal-runaway solution in response to a thermal-runaway solution setting instruction inputted by the user via the user terminal.

The control module can be further configured to control, according to the temporary thermal-runaway solution, at least one fourth thermal-runaway solving device among the multiple thermal-runaway solving devices to solve the thermal runaway for the target energy-storage device, where the temporary thermal-runaway solution is related to the thermal-runaway solution setting instruction, the thermal-runaway solution setting instruction can be used for setting at least one of a type, a quantity, or a position of the at least one fourth thermal-runaway solving device, and the fourth thermal-runaway solving device may correspond to the target energy-storage device and the accident type determined by the user.

In implementations in the disclosure, a user terminal is provided. The user terminal may include a processor, a memory, and a bus. The processor and the memory are connected through the bus, the memory is configured to store a set of program codes, and the processor is configured to invoke the program codes stored in the memory to execute the method described in the above.

In implementations in the disclosure, a computer-readable storage medium is provided. The computer-readable storage medium is configured to store instructions which, when executed by a computer, implement the method described in the above.

By implementing the method of implementations in the disclosure, the user can view the monitoring datum related to the energy-storage device in real time, which is conducive for the user to identify an energy-storage device in which the accident may occur. In addition, when the accident occurs in the energy-storage device, according to the method of implementations in the disclosure, accident information is delivered to the user through the prompt message, which is beneficial for the user to know the accident information in time. Furthermore, the user can select a thermal-runaway solution corresponding to the accident information of the energy-storage device through the user terminal, and adopt effective thermal-runaway solution for the energy-storage device in which the accident occurs, thereby reducing the losses of the user.

To better understand the technical solutions of implementations in the disclosure, a method for remotely solving thermal runaway provided in implementations of the disclosure will be described below in detail in conjunction with the operations in FIG. 1.

Referring to FIG. 1, FIG. 1 is a schematic flowchart of a method for remotely solving thermal runaway provided in implementations of the disclosure. It can be understood that the method described below is performed by a user terminal, which belongs to a system for remotely solving thermal runaway. The system for remotely solving the thermal runaway may include the user terminal, at least one monitoring terminal, multiple thermal-runaway solving devices, and at least one energy-storage device. As illustrated in FIG. 1, the method can include the following.

At S101, at least one monitoring datum transmitted by the at least one monitoring terminal and related to the at least one energy-storage device is received at a preset frequency.

The user terminal involved in the method of implementations in the disclosure may also be referred to as a terminal device. The user terminal may be fixed or mobile. Specifically, the user terminal may be a mobile phone, tablet computer (Pad), computer with wireless transceiver function, wearable terminal device, etc. An operating system of a terminal device at PC end, such as an all-in-one computer, may include but not limited to a Linux system, Unix system, Windows series system (such as Windows xp, Windows 7, etc.), Mac OS X (operating system of Apple computer), and other operating systems. An operating system of a terminal device at mobile end, such as a smart phone, may include but not limited to an Android system, IOS (operating system of Apple phone), Window system, and other operating systems.

Further, the method of implementations in the disclosure may also involve multiple user terminals, and any terminal device, to which an account related to a service for remotely solving thermal runaway is logged in, may be the user terminal. Optionally, on the user terminal, a user can log in to a software for remotely solving thermal runaway, a mini program for remotely solving thermal runaway, or a web page for remotely solving thermal runaway, to obtain the service for remotely solving the thermal runaway. A specific media (or platform) for the user to obtain the remote service is set by a technician according to an actual situation.

It should be noted that, the monitoring terminal in the method of implementations in the disclosure may include a monitoring camera and a sensor. The sensor may include a voltage sensor (which can be used for detecting a voltage of a battery cell), gas sensor (which can be used for detecting existence of a gaseous substance), smoke sensor (which can be used for detecting a density of a particle in smoke), creep-distance sensor (which can be used for detecting a surface resistance of the battery cell), temperature sensor (which can be used for detecting a gas temperature), and pressure sensor (which can be used for detecting a gas pressure). The type of the sensor selected for use is set by the technician according to the actual situation. The above examples are merely to better illustrate the method of implementations in the disclosure.

Furthermore, a relationship between the two among a monitoring terminal, a thermal-runaway solving device, and an energy-storage device, is many-to-many. That is, one monitoring terminal may correspond to multiple thermal-runaway solving devices, one thermal-runaway solving device may correspond to multiple monitoring terminals; one monitoring terminal may correspond to multiple energy-storage devices, one energy-storage device may correspond to multiple monitoring terminals; one thermal-runaway solving device may correspond to multiple energy-storage devices, one energy-storage device may correspond to multiple thermal-runaway solving devices.

In a possible implementation, the method of implementations in the disclosure may include the following.

The monitoring datum may include monitoring video information, a concentration of a target-gas, and temperature and luminance information, where the target-gas may include at least one of carbon monoxide, hydrogen, methane, or propane.

As can be seen, there are various monitoring terminals in the method of implementations in the disclosure, which can provide various monitoring data to the user terminal, facilitating the user terminal to analyze a working state of the energy-storage device in detail and accurately. In addition, in the method of implementations in the disclosure, the user is allowed to obtain the service for remotely solving thermal runaway through various user terminals, thereby facilitating the user to perform safety inspection for the energy-storage device or solve thermal-runaway for the energy-storage device, and facilitating improving a working efficiency of the user.

At S102, when at least one of the at least one monitoring datum is greater than a threshold, an energy-storage device related to the at least one of the at least one monitoring datum is determined as a target energy-storage device.

It should be noted that, the target energy-storage device is an energy-storage device with a danger level greater than a preset value, where the danger level is determined according to the monitoring datum.

Specifically, the danger level (the higher the danger level, the more serious an accident in the energy-storage device) may be evaluated as follows. The danger level is evaluated according to the number (i.e., quantity) of abnormal monitoring data in monitoring data corresponding to the energy-storage device, the more the abnormal monitoring data (which refer to monitoring data that does not satisfy a preset condition, where the preset condition corresponds to a reference value), the higher the danger level of the energy-storage device. Additionally or alternatively, the danger level is evaluated according to a magnitude of a difference between an abnormal monitoring datum in the monitoring data corresponding to the energy-storage device and the reference value, the greater the difference, the higher the danger level of the energy-storage device. Different types of a reference datum (for example, the monitoring datum) may correspond to different reference values. Optionally, in the method of implementations in the disclosure, image recognition can be performed on a monitoring image (or monitoring video) collected by the monitoring camera, and whether an abnormity such as spark or smoke, is contained in the monitoring image (or monitoring video) can be determined, to determine the danger level of the energy-storage device.

Exemplarily, if one abnormal datum exists in monitoring data corresponding to energy-storage device 1 (collected by a monitoring terminal corresponding to energy-storage device 1), five abnormal data exist in monitoring data corresponding to energy-storage device 2 (collected by a monitoring terminal corresponding to energy-storage device 2), and no abnormal datum exists in monitoring data corresponding to energy-storage device 3 (collected by a monitoring terminal corresponding to energy-storage device 3), then a danger level of energy-storage device 1 may be determined as a medium level, and a danger level of energy-storage device 2 may be determined as a high level, a danger level of energy-storage device 3 is determined as a low level. It should be noted that, the above example of an evaluation manner and/or a description manner of the danger level (the low level, the medium level, and the high level) is merely intended to explain the method of implementations in the disclosure and should not constitute any limitation to the disclosure. A specific evaluation manner and/or description manner of the danger level is set by the technician according to the actual situation.

The methods for evaluating an abnormal datum corresponding to different types of the monitoring datum can include the following. For the gas sensor, when at least one of carbon monoxide, hydrogen, methane, or propane is collected, it can be determined as the abnormal datum. Furthermore, if more the gas composition (carbon monoxide, hydrogen, methane, or propane) is determined, which is equivalent to "the greater difference between the abnormal monitoring datum and the reference value", a danger level of an energy-storage device corresponding to the gas sensor can be increased. For the temperature sensor, a temperature reference value (for example, 30° C.) can be set. When a temperature collected by the temperature sensor (e.g., 70° C.) is greater than the preset temperature value (e.g., the temperature reference value), the temperature (70° C. described above) can be determined as the abnormal datum. The greater a difference between the temperature collected by the temperature sensor (the temperature collected is for example 160° C.) and the temperature reference value, the higher a danger level of an energy-storage device corresponding to the temperature. For example, a danger level of an energy-storage device corresponding to 160° C. is higher than that of an energy-storage device corresponding to 70° C.

As can be seen, in the method of implementations in the disclosure, the danger level of the energy-storage device can be determined from multiple perspectives. The fine division is conducive for the user terminal to determine a potential safety hazard of the energy-storage device, and also conducive for the user to know the working state of the energy-storage device more intuitively and make an adjustment measure (or the thermal-runaway solution) in time.

At S103, an accident type of the target energy-storage device is determined according to the at least one of the at least one monitoring datum, a first prompt message is generated, and the first prompt message is presented to the user in at least one manner.

It should be noted that, the at least one manner may include controlling the user terminal to vibrate, controlling the user terminal to play a preset audio, and controlling the user terminal to present a prompting popup window. The first prompt message can be used for prompting existence of a potential safety hazard in the target energy-storage device and the accident type of the target energy-storage device.

Furthermore, the preset audio may be the first prompt message related to the target energy-storage device, such as "A thermal-runaway accident occurred in energy-storage device 2, please quickly solve the thermal runaway thereof!". The preset audio may also be a simple alarm or buzzer.

As can be seen, according to the method of implementation in the disclosure, when there is a target energy-storage device (that is, an energy-storage device in an abnormal situation), the user is prompted by multiple manners, so that the user can know related accident information (such as at least one of position information, model information, or the accident type of the target energy-storage device) in time, facilitating the user to improve an efficiency of solving the thermal runaway remotely.

At S104, a corresponding first preset thermal-runaway solution is determined according to the target energy-storage device and the accident type of the target energy storage, and at least one first thermal-runaway solving device among the multiple thermal-runaway solving devices is controlled to solve the thermal runaway for the target energy-storage device, according to the first preset thermal-runaway solution.

It should be noted that the first thermal-runaway solving device may be a thermal-runaway solving device corresponding to the target energy-storage device and the accident type of the target energy-storage device.

Possibly, for different abnormal situations of the energy-storage device, at least one preset thermal-runaway solution is provided in the method of implementation in the disclosure. The preset thermal-runaway solution may be set by the technician according to the related thermal-runaway solution, and may also be set by the user according to the actual installation (or distribution) situation of the energy-storage device. When there is a target energy-storage device, the user terminal determines a proposed thermal-runaway solution (for example, the first preset thermal-runaway solution at S104) according to the accident type and a current accident situation (for example, a spread scope of the accident) of the target energy-storage device. The user terminal controls, according to the proposed solution (for example, the first preset thermal-runaway solution at S104), a thermal-runaway solving device corresponding to the target energy-storage device to solve thermal runaway for the target energy-storage device. Furthermore, in the thermal-runaway solution, there may be at least one thermal-runaway solving device, and at least one control solution for the at least one thermal-runaway solving device (adjusting and controlling at least one of: a spraying speed of a suppression medium, a spraying duration of the suppression medium, a working duration and a rotating speed of an exhaust fan, or a laying manner of a fire-proof and explosion-proof layer).

Exemplarily, assuming that energy-storage device 2 is the target energy-storage device, an accident occurred belongs to accident type 1 (corresponding to thermal-runaway solution 1, thermal-runaway solution 2, or thermal-runaway solution 3), if thermal-runaway solution 1 is the proposed thermal-runaway solution, thermal-runaway solution 1 and the first prompt message can be displayed together in the prompting popup window. "An accident corresponding to accident type 1 occurred in energy-storage device 2, and thermal runaway solution 1 has been adopted to solve the thermal runaway for energy-storage device 2" and the like may be included in the prompting popup window. The user terminal controls, according to thermal-runaway solution 1, at least one thermal-runaway solving device corresponding to energy-storage device 2 to solve the thermal runaway for energy-storage device 2.

As can be seen, in the method of implementations in the disclosure, a suitable thermal-runaway solution (such as the foregoing proposed thermal-runaway solution) is determined according to the accident type of the target energy-storage device, facilitating avoiding waste of rescue time (time for solving the thermal runaway), and further improving the efficiency of solving the thermal runaway for the target energy-storage device, thereby further reducing the losses of the user.

In a possible implementation, according to the monitoring datum, a monitoring datum transmitted by at least one monitoring terminal corresponding to the target energy-storage device is displayed, and a situation of the target energy-storage device is presented in multiple perspectives.

Exemplarily, assuming that energy-storage device 2 is the target energy-storage device, if monitoring camera 1 corresponding to energy-storage device 2 is blocked by the smoke, and unable to obtain a specific accident situation (or accident image) of energy-storage device 2, then the user terminal displays a monitoring image (or monitoring video) collected by monitoring camera 2 (which can obtain a clear accident situation or accident image of energy-storage device 2) corresponding to energy-storage device 2. If sensor 1 corresponding to energy-storage device 2 is damaged due to the accident in energy-storage device 2, and the monitoring datum is unable to be transmitted to the user terminal, then the user terminal displays a monitoring datum collected by sensor 2 (which can work normally) corresponding to energy-storage device 2.

Moreover, sensor 2 described above may be a sensor closest to energy-storage device 2 and capable of normal transmission, and may also be a sensor within a preset distance from energy-storage device 2 and with a good working state. A specific display scheme of the monitoring datum is set by the technician according to the actual situation.

As can be seen, in the method of implementations in the disclosure, the present (or display) scheme of the monitoring datum can be adjusted in time according to the working state of the monitoring terminal, facilitating providing the most accurate monitoring datum for the user, and further facilitating the user to select the suitable thermal-runaway solution.

At S105, in response to a thermal-runaway solution switching instruction inputted by the user via the user terminal, the first preset thermal-runaway solution is switched to a second preset thermal-runaway solution, and at least one second thermal-runaway solving device among the multiple thermal-runaway solving devices is controlled to solve the thermal runaway for the target energy-storage device, according to the second preset thermal-runaway solution.

It should be noted that, the second preset thermal-runaway solution is related to the thermal-runaway solution switching instruction, the second thermal-runaway solving device is a thermal-runaway solving device corresponding to the target energy-storage device and an accident type determined by the user, and the second thermal-runaway solving device represents a thermal-runaway solving device corresponding to the target energy-storage device and the accident type determined by the user.

Figure 2:
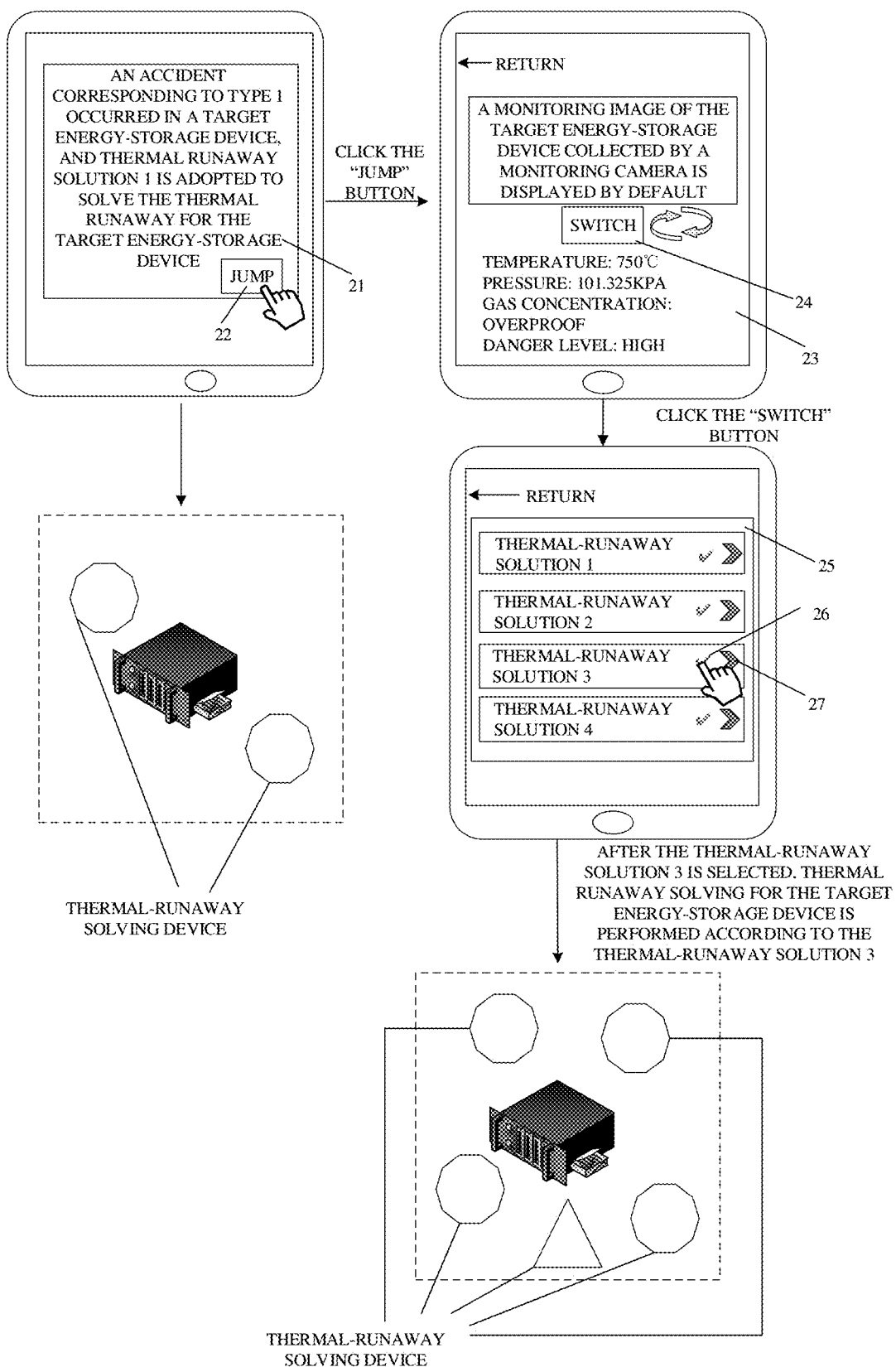
FIG. 2 is a schematic scenario diagram illustrating switching of thermal-runaway solutions provided in implementations of the disclosure.

Exemplarily, referring to FIG. 2, FIG. 2 is a schematic scenario diagram illustrating switching of thermal-runaway solutions provided in implementations of the disclosure. As illustrated in FIG. 2, when there is a target energy-storage device, the user terminal can present a prompt message as illustrated in a prompting popup window 21. If the user clicks a button 22 (that is, a "jump" button in FIG. 2), then the user terminal displays a monitoring data interface 23 corresponding to the target energy-storage device. After observing the related monitoring datum of the target energy-storage device, if the user determines that the user terminal is wrong in determining the accident type of the target energy-storage device, or determines that thermal-runaway solution 1 is unable to satisfy a requirement for solving thermal runaway of the target energy-storage device, then the user can click a button 24 (that is, a "switch" button in FIG. 2) in the monitoring data interface 23, and then a thermal-runaway solution list 25 (as illustrated in FIG. 2, the thermal-runaway solution list 25 may include thermal-runaway solution 1, thermal-runaway solution 2, thermal-runaway solution 3, and thermal-runaway solution 4) is displayed in the user terminal. At least one corresponding thermal-runaway solving device is controlled, according to a thermal-runaway solution selected from the thermal-runaway solution list 25 by the user, to solve the thermal runaway for the target energy-storage device. As illustrated in FIG. 2, if the user clicks a tick button 26 (equivalent to the second preset thermal-runaway solution referred above) on the right of thermal-runaway solution 3 in the thermal-runaway solution list 25, then the user terminal controls, according to thermal-runaway solution 3, at least one corresponding thermal-runaway solving device to solve the thermal runaway for the target energy-storage device. Furthermore, the user can also click an arrow button 27 on the right of thermal-runaway solution 3 in the thermal-runaway solution list 25 to view details of thermal-runaway solution 3.

A thermal-runaway solution adopted for the target energy-storage device by the user terminal is determined. In the monitoring data interface, there may be a monitoring datum fed back by the at least one monitoring device corresponding to the target energy-storage device, and a control region of at least one thermal-runaway solving device related to the target energy-storage device. The user can input or set, in the control region of the thermal-runaway solving device, the control solution for the thermal-runaway solving device (for example, adjusting and controlling at least one of: the spraying speed of the suppression medium, the spraying duration of the suppression medium, the working duration and the rotating speed of the exhaust fan, or the laying manner of the fire-proof and explosion-proof layer). Moreover, the at least one thermal-runaway solving device related to the target energy-storage device refers to a thermal-runaway solving device capable of solving the thermal runaway for the target energy-storage device, which means that the target energy-storage device is within a thermal-runaway solving range of the thermal-runaway solving device (that is, a range or region in which the thermal-runaway solving device can effectively solve the thermal runaway).

As can be seen, according to the method of implementations in the disclosure, a greater degree of control freedom for solving the thermal runaway is provided for the user, and the user is allowed to switch the thermal-runaway solution according to the actual situation, facilitating achieving the best effect of solving the thermal runaway and reducing the losses caused by the accident.

At S106, in response to a thermal-runaway solution adding instruction inputted by the user via the user terminal, the at least one first thermal-runaway solving device and at least one third thermal-runaway solving device among the multiple thermal-runaway solving devices are controlled to solve the thermal runaway for the target energy-storage device, according to the first preset thermal-runaway solution and a third preset thermal-runaway solution.

It should be noted that, the third preset thermal-runaway solution is related to the thermal-runaway solution adding instruction, and the third thermal-runaway solving device is a thermal-runaway solving device corresponding to the target energy-storage device and the accident type of the target energy-storage device, or a thermal-runaway solving device corresponding to the accident type determined by the user.

Exemplarily, in the method of implementations in the disclosure, if the user determines that the proposed thermal-runaway solution (assuming to be thermal-runaway solution 5) generated for the target energy-storage device is unable to satisfy the requirement for solving the thermal runaway of the target energy-storage device, then the user can select to add one or more other thermal-runaway solutions (assuming that the user adds thermal-runaway solution 6 and thermal-runaway solution 7). Then the user terminal can control, according to all of thermal-runaway solution 5, thermal-runaway solution 6, and thermal-runaway solution 7, at least one corresponding thermal-runaway solving device to solve the thermal runaway for the target energy-storage device.

Moreover, the user can input the adding instruction via the monitoring data interface or the prompting popup window (for example, an "add" button is set or displayed in the monitoring data interface or the prompting popup window). The user can also input the switching instruction via the monitoring data interface or the prompting popup window, and then select multiple thermal-runaway solutions from the thermal-runaway solution list, thereby achieving an effect of "implementing multiple thermal-runaway solutions in parallel".

As can be seen, the user can flexibly adjust the thermal-runaway solution by implementing the method of implementations in the disclosure, thereby solving the thermal runaway more accurately for the target energy-storage device, facilitating achieving a better effect of solving the thermal runaway, and further reducing the losses of the user.

At S107, in response to a thermal-runaway solution setting instruction inputted by the user via the user terminal, a temporary thermal-runaway solution is generated, and at least one fourth thermal-runaway solving device among the multiple thermal-runaway solving devices is controlled to solve the thermal runaway for the target energy-storage device, according to the temporary thermal-runaway solution.

It should be noted that, the temporary thermal-runaway solution is related to the thermal-runaway solution setting instruction, the thermal-runaway solution setting instruction can be used for setting at least one of a type, a quantity, or a position of the at least one fourth thermal-runaway solving device, and the fourth thermal-runaway solving device may be a thermal-runaway solving device corresponding to the target energy-storage device and the accident type determined by the user.

Exemplarily, in the method of implementations in the disclosure, if the user determines that the proposed thermal-runaway solution (assuming to be thermal-runaway solution 5) generated for the target energy-storage device is unable to satisfy the requirement for solving the thermal runaway of the target energy-storage device, then the user can customize a new thermal-runaway solution (assuming to be thermal-runaway solution 8). The user can set a name of thermal-runaway solution 8, a thermal-runaway solving device corresponding to thermal-runaway solution 8, and a control solution for the thermal-runaway solving device corresponding to thermal-runaway solution 8 (for example, adjusting and controlling at least one of: the spraying speed of the suppression medium, the spraying duration of the suppression medium, the working duration and the rotating speed of the exhaust fan, or the laying manner of the fire-proof and explosion-proof layer).

Moreover, after the user inputs the switching instruction via the monitoring data interface or the prompting popup window, and the user terminal displays the thermal-runaway solution list, the user can add a customized thermal-runaway solution to the thermal-runaway solution list. The user can also input a customized instruction via the monitoring data interface or the prompting popup window (for example, a "customized" button is set or displayed in the prompting popup window).

Exemplarily, assuming that an abnormal phenomenon (a rapid temperature rise with a fire) occurs in energy-storage device 4, and the fire may spread to energy-storage device 5 and energy-storage device 6, a first proposed solution is to isolate energy-storage device 4 entirely with a fully submerged spray-header (spraying the suppression medium). The user can set thermal-runaway solution 9. Thermal-runaway solution 9 can be to arrange the fire-proof and explosion-proof layer around energy-storage device 4 to form an isolation space, and use a spray-header to solve the thermal runaway for energy-storage device 4 in the isolation space, and after the fire during thermal runaway is put out, the exhaust fan is opened to completely exhaust smoke or other impurities produced from combustion, and then the fire-proof and explosion-proof layer is removed. In addition, the user terminal can control, according to thermal-runaway solution 9, a corresponding thermal-runaway solving device to solve the thermal runaway for energy-storage device 4. In this way, the thermal runaway can be solved for an abnormal energy-storage device without affecting operations of other energy-storage devices (such as energy-storage device 5 and energy-storage device 6).

As can be seen, in the method of implementations in the disclosure, the user is allowed to set a most suitable thermal-runaway solution for the target energy-storage device according to an actual accident situation of the target energy-storage device, facilitating improving the efficiency of solving the thermal runaway for the target energy-storage device, and achieving a better effect of solving the thermal runaway for the target energy-storage device.

Furthermore, the first preset thermal-runaway solution, the second preset thermal-runaway solution, the third preset thermal-runaway solution, and the temporary thermal-runaway solution each can be used for adjusting and controlling at least one of: the spraying speed of the suppression medium, the spraying duration of the suppression medium, the working duration and the rotating speed of the exhaust fan, or the laying manner of the fire-proof and explosion-proof layer.

Specifically, the suppression medium may be at least one of foam, dry powder, halo alkane, dioxide, or water. The fire-proof and explosion-proof layer (a form of a fire-proof and explosion-proof safety device) can be filled with flame retardant materials, and can effectively prevent fire spreading. Moreover, common fire-proof and explosion-proof safety devices can be divided into two categories: a fire blocking device, and an explosion-proof and pressure-relieving device. The fire blocking device includes a fire arrester, a safety liquid seal, a one-way valve, a fire blocking gate, etc. The fire arrester includes several types: a wire-fabric fire arrester, a corrugated-metal-sheet fire arrester, and a gravel fire arrester.

In a possible implementation, the method of implementations in the disclosure can include the following. A control instruction input by the user via the monitoring data interface is received, and at least one fifth thermal-runaway solving device is controlled, according to the control instruction, to solve the thermal runaway for the target energy-storage device.

Exemplarily, assuming that a thermal runaway accident occurs in energy-storage device 4, if the user receives the prompt message presented by the user terminal, and the user inputs a jump instruction via the prompting popup window, then the user terminal presents to the user a monitoring data interface related to energy-storage device 4. The user can view a current accident situation of energy-storage device 4 in real time at the monitoring data interface related to energy-storage device 4, flexibly input the control instruction according to the current accident situation of energy-storage device 4, and then solve the thermal runaway for energy-storage device 4.

It should be noted that, before the user inputs the control instruction via the monitoring data interface, the user terminal has already performed solving of the thermal-runaway for energy-storage device 4 according to a thermal-runaway solution that the user confirms, switches, adds or customizes in the prompting popup window. The control instruction input by the user via the monitoring data interface is to assist the above thermal-runaway solution, and to flexibly adjust the related thermal-runaway solution according to the current accident situation of energy-storage device 4.

As can be seen, in the method of implementations in the disclosure, after the user confirms, switches, adds or customizes the thermal-runaway solution, the user is allowed to continue to adjust the thermal-runaway solution timely and flexibly according to the current accident situation of the target energy-storage device, facilitating ensuring the effect of solving the thermal runaway for the target energy-storage device, so that the accident in the target energy-storage device can be processed more pertinently.

In another possible implementation, the method of implementations in the disclosure can include the following. After a thermal-runaway solution to-be-implemented is determined by the user terminal, if an implementing duration of the thermal-runaway solution implemented reaches a preset duration and the at least one of the at least one monitoring datum is currently still greater than the threshold, the accident type of the target energy-storage device is re-determined according to the at least one of the at least one monitoring datum, and a second prompt message is presented to the user, where the second prompt message can be used for prompting the user to switch the thermal-runaway solution currently implemented.

Assuming that the user terminal determines, at 10:02 a.m., that an abnormal situation (a rapid temperature rise with dense smoke) occurs in energy-storage device 7, the user terminal quickly determines an accident type of energy-storage device 7 (assuming that the accident type is "light internal self-ignition"), and selects and implements thermal-runaway solution 10 to solve the thermal runaway for energy-storage device 7. If a monitoring datum corresponding to energy-storage device 7 displays that a wide range of a fire occurs outside of energy-storage device 7 at 10:07 a.m. (the preset duration is set as 5 minutes), then the user terminal can re-determine the accident type of energy-storage device 7 (assuming to be "severe self-ignition"), and determine to select and implement thermal-runaway solution 11 to control the abnormal situation of energy-storage device 7, or the user terminal can further present the prompt message to the user, to prompt the user to switch the thermal-runaway solution currently implemented (for example, thermal-runaway solution 10 described above).

Furthermore, on the basis that the accident type of the target energy-storage device and the corresponding thermal-runaway solution are re-determined according to a current monitoring datum, according to the method of implementations in the disclosure, alarm information can be further transmitted to the multiple thermal-runaway solving devices, where the alarm information may include position information of the target energy-storage device and the at least one of the at least one monitoring datum. The thermal-runaway solving device may be a server, a host, or the like of a thermal-runaway solving mechanism. The user terminal transmits the position information and the current monitoring datum (of the target energy-storage device) to the thermal-runaway solving device, which is conducive for a thermal-runaway solving staff to know more current accident details, thereby formulating a more suitable thermal-runaway solution.

As can be seen, in the method of implementations in the disclosure, when thermal-runaway solving is performed on the target energy-storage device, continued attention is paid to an effect of the thermal-runaway solving on the target energy-storage device. When it is determined that a current thermal-runaway solution is unable to satisfy the requirement for solving the thermal runaway of the target energy-storage device, the user terminal will re-evaluate the accident type of the target energy-storage device, and determine a new thermal-runaway solution, or notify the user to switch the thermal-runaway solution, facilitating ensuring the effect of solving the thermal runaway for the target energy-storage device to the greatest extent, and reducing the losses of the user.

In another possible implementation, the method of implementations in the disclosure can include the following. After a corresponding thermal-runaway solving device is controlled, according to a thermal-runaway solution currently determined, to solve the thermal runaway for the target energy-storage device, if all thermal-runaway solving devices corresponding to the thermal-runaway solution currently determined fail, another disabled thermal-runaway solving device which is of the same type as all corresponding thermal-runaway solving devices and corresponds to the target energy-storage device is enabled.

It should be noted that, the thermal-runaway solution currently determined may be the first preset thermal-runaway solution, the second preset thermal-runaway solution, the third preset thermal-runaway solution, or the temporary thermal-runaway solution, and may also be an adjusted thermal-runaway solution formulated by the user when observing the current accident situation of the target energy-storage device. The foregoing method of implementations in the disclosure means that, according to the method of implementations in the disclosure, the working state of the thermal-runaway solving device can be determined at any time and corresponding remedial measures can be made. For the thermal-runaway solving device corresponding to the target energy-storage device, the target energy-storage device is located in the thermal-runaway solving range of the thermal-runaway solving device, and the thermal-runaway solving device can effectively solve the thermal runaway for the target energy-storage device. For example, a certain thermal-runaway solving device 1 corresponding to energy-storage device 1 is a thermal-runaway solving device for spraying the suppression medium, and if a spraying range of thermal-runaway solving device 1 is 2 meters, then a distance between energy-storage device 1 and thermal-runaway solving device 1 is less than 2 meters.

Exemplarily, when the user terminal solves the thermal runaway for energy-storage device 7 by using thermal-runaway solution 10, if the user observes, from a monitoring image corresponding to energy-storage device 7, that thermal-runaway solving device 2 corresponding to thermal-runaway solution 10 does not start to solve the thermal runaway, then it can be determined that thermal-runaway solving device 2 fails, and a disabled thermal-runaway solving device 3, which is of the same type as thermal-runaway solving device 2 and corresponds to energy-storage device 7, is enabled to solve the thermal runaway for energy-storage device 7.

As can be seen, in the method of implementations in the disclosure, when solving of the thermal runaway for the target energy-storage device is performed, an attention is constantly paid to the working state of the corresponding thermal-runaway solving device. When the thermal-runaway solving device fails, other effective thermal-runaway solving devices can be used to solve the thermal runaway for the target energy-storage device, facilitating ensuring the effect of solving thermal runaway for the target energy-storage device, and completing a task of solving thermal runaway as planned.

In another possible implementation, the method of implementations in the disclosure can include the following. In response to a first viewing instruction received by the user terminal, the user terminal displays a list of the at least one energy-storage device. In response to a first selecting instruction received by the user terminal, the user terminal displays at least one first monitoring datum related to a first energy-storage device among the at least one energy-storage device, where the first selecting instruction can be used for selecting the first energy-storage device from the list.

Figure 3A:
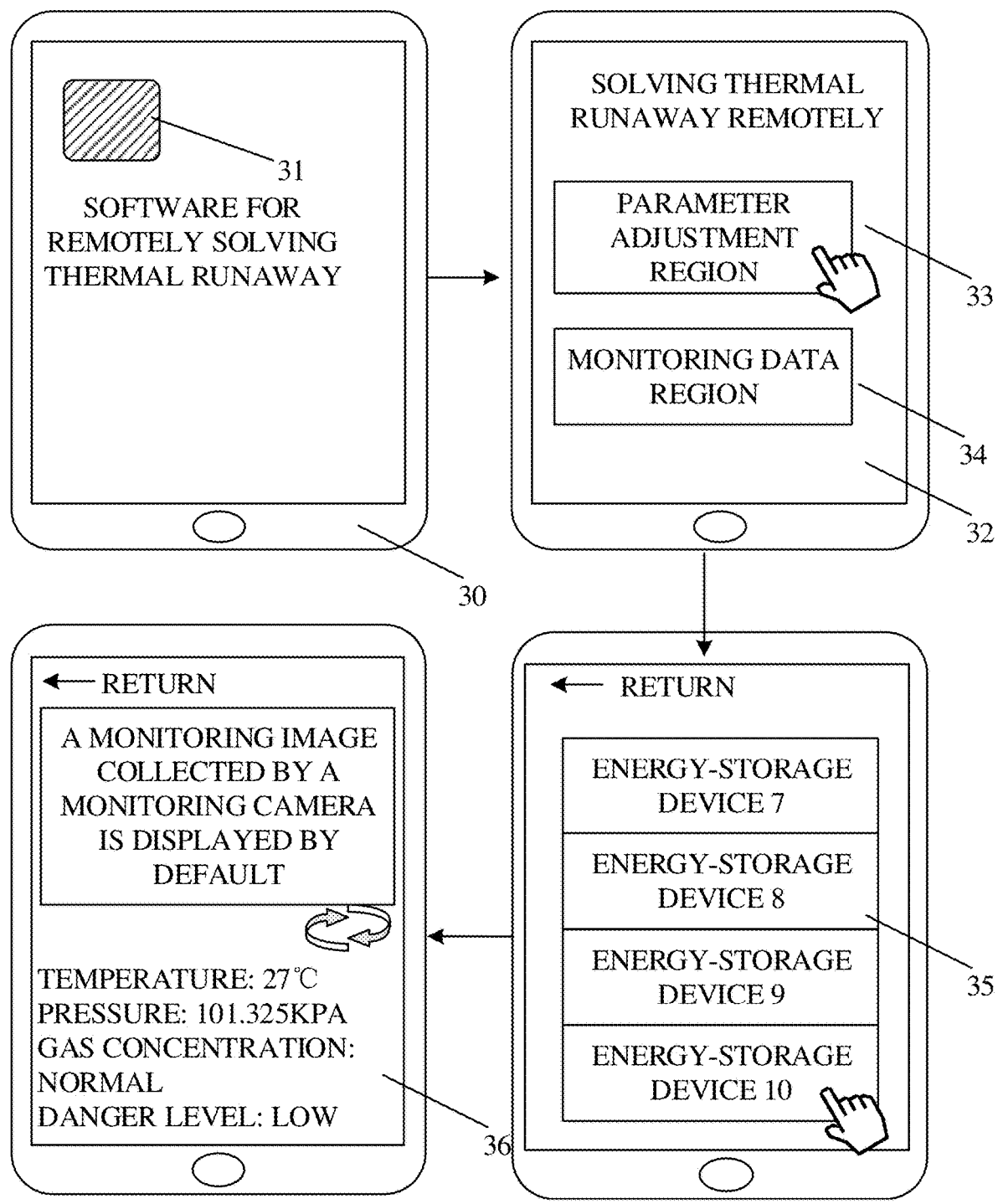
FIG. 3A is a schematic scenario diagram illustrating viewing of parameters for remotely solving thermal runaway provided in implementations of the disclosure.

Exemplarily, referring to FIG. 3A, FIG. 3A is a schematic scenario diagram illustrating viewing of parameters for remotely solving thermal runaway provided in implementations of the disclosure. As illustrated in FIG. 3A, when the user clicks a software 31 for remotely solving thermal runaway displayed in a desktop of the user terminal 30, the user terminal presents a control interface 32 for remotely solving thermal runaway (including a parameter adjustment region 33 and a monitoring data region 34). When the user clicks the monitoring data region 34, the user terminal displays a list 35, and the user can select, from the list 35, a related monitoring datum of an energy-storage device that the user wants to view (as illustrated in FIG. 3A, the user can click energy-storage device 10), and then a monitoring datum related to energy-storage device 10 is displayed in an interface 36.

As can be seen, the user can view the monitoring datum related to the energy-storage device at any time, which is conducive for the user to know the working state of the energy-storage device accurately.

In another possible implementation, after the user terminal displays the first monitoring datum related to the first energy-storage device among the at least one energy-storage device, in response to the first selecting instruction received by the user terminal, the method of implementations in the disclosure can further include the following. In response to a switching instruction received by the user terminal, a monitoring terminal that monitors the first energy-storage device is switched to another monitoring terminal that monitors the first energy-storage device. A second monitoring datum collected from the another monitoring terminal and related to the first energy-storage device is displayed.

Figure 3B:
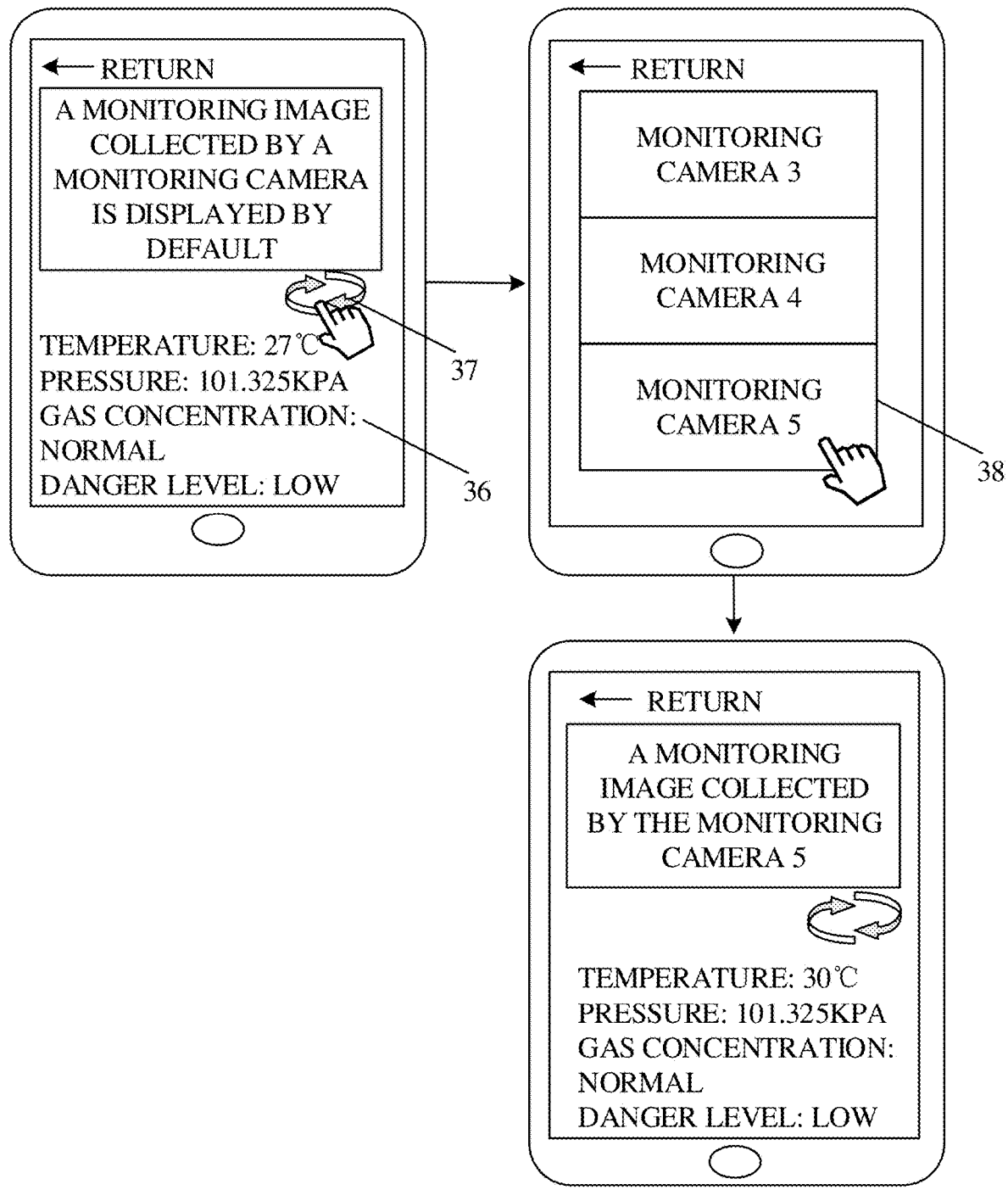
FIG. 3B is another schematic scenario diagram illustrating viewing of parameters for remotely solving thermal runaway provided in implementations of the disclosure.

Exemplarily, as illustrated in FIG. 3B, FIG. 3B is another schematic scenario diagram illustrating viewing of parameters for remotely solving thermal runaway provided in implementations of the disclosure. As illustrated in FIG. 3B, the user can switch, in the interface 36, a monitoring view angle of the energy-storage device (for example, by clicking a button 37 in FIG. 3B), and then the user terminal displays a popup window 38, where names of monitoring cameras (such as monitoring camera 3, monitoring camera 4 and monitoring camera 5 in FIG. 3B) corresponding to the energy-storage device are displayed in the popup window 38. The user can switch the monitoring view angle by clicking buttons corresponding to different names of the monitoring cameras.

It should be noted that, with the switching of the monitoring view angle, a monitoring datum corresponding to the energy-storage device may be different. Exemplarily, as illustrated in FIG. 3B, when the user views a monitoring datum of energy-storage device 10, it is assumed that an image captured by monitoring camera 3 and a monitoring datum collected by a sensor related to monitoring camera 3 are displayed by default. If the user switches the monitoring image to an image captured by monitoring camera 5, then the monitoring datum previously collected by the sensor related to monitoring camera 3 becomes a monitoring datum collected by a sensor related to monitoring camera 5. Since distances between different monitoring cameras and the energy-storage device are different, monitoring data collected by sensors related to different monitoring cameras may also be different, and a monitoring datum collected by a sensor closer to the energy-storage device may be more accurate.

As can be seen, according to the method of implementations in the disclosure, the user can switch different monitoring view angles, and different monitoring data can be present according to a monitoring view angle selected by the user, which is conducive for the user to know the working state of the energy-storage device more comprehensively and accurately, and make adaptive adjustments to various thermal-runaway solving devices, thereby further reducing an occurrence probability of the accident.

In another possible implementation, displaying a list (for example, a monitoring list) of the at least one energy-storage device in response to the first viewing instruction inputted by the user via the monitoring data region can include the following. The at least one energy-storage device is ranked from high to low according to the danger level(s) of the at least one energy-storage device, and the monitoring list is generated.

Exemplarily, for the foregoing exemplified energy-storage device 1, energy-storage device 2, and energy-storage device 3, if energy-storage device 1, energy-storage device 2, energy-storage device 3, and energy-storage device 6 (assuming that no abnormal datum exists in energy-storage device 6) are included in the monitoring list, then energy-storage device 1, energy-storage device 2, energy-storage device 3, and energy-storage device 6 are ranked according to the danger levels, and in the monitoring list generated, the ranking order is: energy-storage device 2, energy-storage device 1, energy-storage device 3, and energy-storage device 6.

Energy-storage devices with the same danger level (for example, energy-storage device 3 and energy-storage device 6) may be ranked according to the serial number of the energy-storage device (energy-storage device 3 is ranked in front of energy-storage device 6), or a service year of the energy-storage device (due to the longer the service year, the higher the probability of the accident in the energy-storage device, the energy-storage device with a long service year can be ranked in the front), or the latest update time of the monitoring datum of the energy-storage device, or a spatial position of the energy-storage device. It should be noted that, the foregoing examples of the ranking manners for the energy-storage devices with the same danger level are merely intended to describe the method of implementations in the disclosure in more detail, and a specific ranking manner is set by the technician according to the actual situation.

As can be seen, according to the method of implementations in the disclosure, the energy-storage devices are ranked according to the danger levels of the energy-storage devices, and multiple factors are further considered to generate a suitable monitoring list for the user, which is conducive for the user to check for the abnormal energy-storage device in daily work and notice an abnormality of the energy-storage device within the shortest time, so that the accident can be prevented effectively.

In another possible implementation, the method of implementations in the disclosure can include the following. A parameter adjusting instruction received by the user terminal is transmitted to the at least one monitoring terminal and/or the at least one thermal-runaway solving device, where the parameter adjusting instruction can be used for setting the threshold and/or a thermal-runaway solving parameter of the at least one thermal-runaway solving device, and the thermal-runaway-solving parameter may include a storage capacity of the suppression medium.

Specifically, the user can view a state of each thermal-runaway solving device (for example, the storage capacity of the suppression medium, whether the exhaust fan can operate normally, whether the fire-proof and explosion-proof layer is broken, whether the fire-proof and explosion-proof layer can be moved normally, or whether the sensor can work normally, etc.) in daily work. The user can also operate various thermal-runaway solving devices at the parameter adjusting interface, to detect whether the thermal-runaway solving device can work normally.

As can be seen, in the method of implementations in the disclosure, the user is allowed to debug the thermal-runaway solving device through the user terminal, to detect whether the thermal-runaway solving device can work normally, facilitating ensuring that the thermal-runaway solving device can effectively control a fire when the accident occurs in the energy-storage device.

In another possible implementation, before presenting the control interface for remotely solving the thermal runaway in response to an enabling instruction from the user, the method of implementations in the disclosure can further include: receiving a log-in instruction from the user, where the log-in instruction can be used for obtaining a control authority for remotely solving thermal runaway.

Specifically, the user can log in to the software for remotely solving the thermal runaway, the mini program for remotely solving the thermal runaway, or the web page for remotely solving the thermal runaway in a manner of "account-password", facial recognition, fingerprint recognition, or other software-authorized manners.

Moreover, according to different user accounts, control authorities corresponding to the accounts may also be different. The control authorities may include "view only" and "view and control". It should be noted that, the foregoing examples of the control authority are merely intended to explain the method of implementations in the disclosure, and do not mean that the control authority can only be classified in the foregoing manner. The technician can set a more detailed level of the control authority and a method for allocating the control authority according to the actual situation, which is not limited herein.

As can be seen, according to the method of implementations in the disclosure, the user can remotely view the working state of the energy-storage device, and remotely control the thermal-runaway solving device to solve the thermal runaway for the abnormal energy-storage device (referring to the energy-storage device in which the accident occurs), thereby improving the working efficiency of the user and/or the efficiency of solving the thermal runaway. In addition, the user can comprehensively know the working state or the abnormal state of the energy-storage device through different monitoring view angles, which is conducive for the user to adopt a more effective and more suitable thermal-runaway solution to handle the accident, thereby reducing the losses.

The apparatus involved in implementations of the disclosure will be described below with reference to the accompanying drawings.

Figure 4:
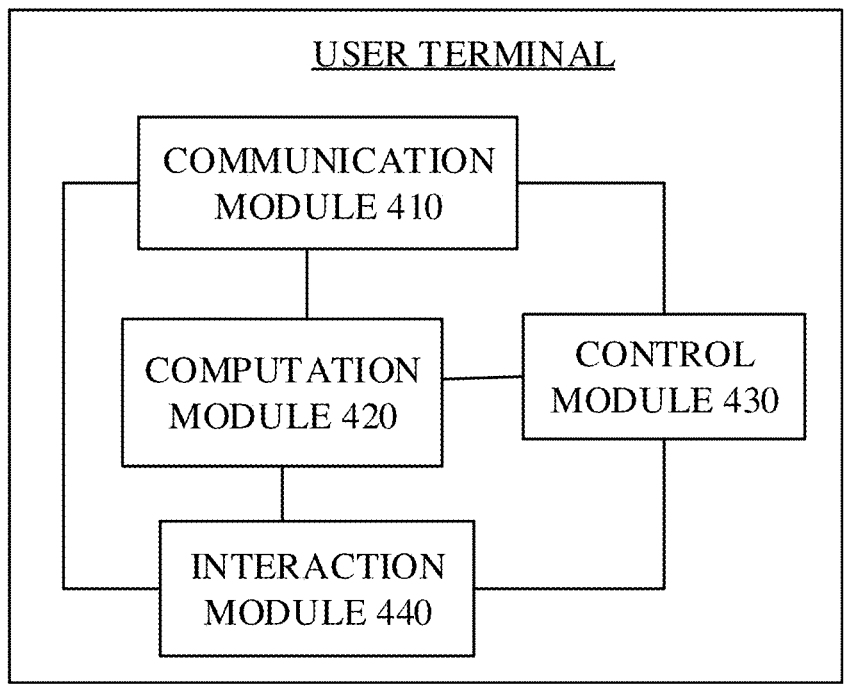
FIG. 4 is a schematic structural diagram of a user terminal provided in implementations of the disclosure.

Referring to FIG. 4, FIG. 4 is a schematic structural diagram of a user terminal provided in implementations of the disclosure. The user terminal may include a communication module 410, a computation module 420, a control module 430, and an interaction module 440.

The communication module 410 can be configured to receive, at a preset frequency, at least one monitoring datum transmitted by at least one monitoring terminal and related to at least one energy-storage device, where the monitoring datum may include monitoring video information, a concentration of a target-gas, and temperature and luminance information, where the target-gas may include at least one of carbon monoxide, hydrogen, methane, or propane.

The computation module 420 can be configured to determine an energy-storage device related to at least one of the at least one monitoring datum as a target energy-storage device, when the at least one of the at least one monitoring datum is greater than a threshold.

The computation module 420 can be further configured to, when the target energy-storage device exists, determine an accident type of the target energy-storage device according to the at least one of the at least one monitoring datum, and generate a first prompt message, where the first prompt message can be used for prompting existence of a potential safety hazard in the target energy-storage device and the accident type of the target energy-storage device.

The control module 430 can be configured to present the first prompt message to a user in at least one manner, where the at least one manner may include controlling the user terminal to vibrate, controlling the user terminal to play a preset audio, and controlling the user terminal to present a prompting popup window.

The computation module 420 can be further configured to determine, according to the target energy-storage device and the accident type of the target energy storage, a corresponding first preset thermal-runaway solution, in response to a confirmation instruction inputted by the user via the prompting popup window.

The control module 430 can be further configured to control, according to the first preset thermal-runaway solution, at least one first thermal-runaway solving device among multiple thermal-runaway solving devices to solve thermal runaway for the target energy-storage device, where the first thermal-runaway solving device may correspond to the target energy-storage device and the accident type of the target energy-storage device.

The computation module 420 can be further configured to switch the first preset thermal-runaway solution to a second preset thermal-runaway solution, in response to a thermal-runaway solution switching instruction inputted by the user via the user terminal, where the second preset thermal-runaway solution is related to the thermal-runaway solution switching instruction.

The control module 430 can be further configured to control, according to the second preset thermal-runaway solution, at least one second thermal-runaway solving device among the multiple thermal-runaway solving devices to solve the thermal runaway for the target energy-storage device, where the second thermal-runaway solving device may correspond to the target energy-storage device and an accident type determined by the user.

The control module 430 can be further configured to control, according to the first preset thermal-runaway solution and a third preset thermal-runaway solution, the at least one first thermal-runaway solving device and at least one third thermal-runaway solving device among the multiple thermal-runaway solving devices to solve the thermal runaway for the target energy-storage device, in response to a thermal-runaway solution adding instruction inputted by the user via the user terminal, where the third preset thermal-runaway solution is related to the thermal-runaway solution adding instruction, and the third thermal-runaway solving device may correspond to the target energy-storage device and the accident type of the target energy-storage device, or correspond to the accident type determined by the user.

The control module 430 can be further configured to generate a temporary thermal-runaway solution in response to a thermal-runaway solution setting instruction inputted by the user via the user terminal.

The control module 430 can be further configured to control, according to the temporary thermal-runaway solution, at least one fourth thermal-runaway solving device among the multiple thermal-runaway solving devices to solve the thermal runaway for the target energy-storage device, where the temporary thermal-runaway solution is related to the thermal-runaway solution setting instruction, the thermal-runaway solution setting instruction can be used for setting at least one of a type, a quantity, or a position of the at least one fourth thermal-runaway solving device, and the fourth thermal-runaway solving device may correspond to the target energy-storage device and the accident type determined by the user.

In a possible implementation, the first preset thermal-runaway solution, the second preset thermal-runaway solution, the third preset thermal-runaway solution, and the temporary thermal-runaway solution each can be used for adjusting and controlling at least one of: a spraying speed of a suppression medium, a spraying duration of the suppression medium, a working duration and a rotating speed of an exhaust fan, or a laying manner of a fire-proof and explosion-proof layer. The computation module 420 can be further configured to, after a thermal-runaway solution to-be-implemented is determined by the user terminal, if an implementing duration of the thermal-runaway solution implemented reaches a preset duration and the at least one of the at least one monitoring datum is currently still greater than the threshold, re-determine the accident type of the target energy-storage device according to the at least one of the at least one monitoring datum. The control module 430 can be further configured to present a second prompt message to the user, where the second prompt message can be used for prompting the user to switch the thermal-runaway solution currently implemented.

In another possible implementation, the control module 430 can be further configured to control the user terminal to display a list of the at least one energy-storage device, in response to a first viewing instruction received by the user terminal. The control module 430 can be further configured to control the user terminal to display a first monitoring datum related to a first energy-storage device among the at least one energy-storage device, in response to a first selecting instruction received by the user terminal, where the first selecting instruction can be used for selecting the first energy-storage device from the list.

In another possible implementation, the interaction module 440 can be configured to switch from a monitoring terminal that monitors the first energy-storage device to another monitoring terminal that monitors the first energy-storage device, in response to a switching instruction received by the user terminal. The control module 430 can be further configured to display a second monitoring datum collected from the another monitoring terminal and related to the first energy-storage device.

In another possible implementation, The communication module 410 can be further configured to transmit a parameter adjusting instruction received by the user terminal to the at least one monitoring terminal and/or at least one of the multiple thermal-runaway solving devices, where the parameter adjusting instruction can be used for setting the threshold and/or a thermal-runaway solving parameter of the at least one of the multiple thermal-runaway solving devices, and the thermal-runaway solving parameter can include a storage capacity of the suppression medium.

In another possible implementation, the communication module 410 can be further configured to transmit alarm information to the multiple thermal-runaway solving devices, where the alarm information can include position information of the target energy-storage device and the at least one of the at least one monitoring datum.

In another possible implementation, The control module 430 can be further configured to, after a corresponding thermal-runaway solving device is controlled, according to a thermal-runaway solution currently determined, to solve the thermal runaway for the target energy-storage device, if all thermal-runaway solving devices corresponding to the thermal-runaway solution currently determined fail, enable another disabled thermal-runaway solving device which is of the same type as all corresponding thermal-runaway solving devices and corresponds to the target energy-storage device, where the thermal-runaway solution currently determined may be the first preset thermal-runaway solution, the second preset thermal-runaway solution, the third preset thermal-runaway solution, or the temporary thermal-runaway solution.

Figure 5:
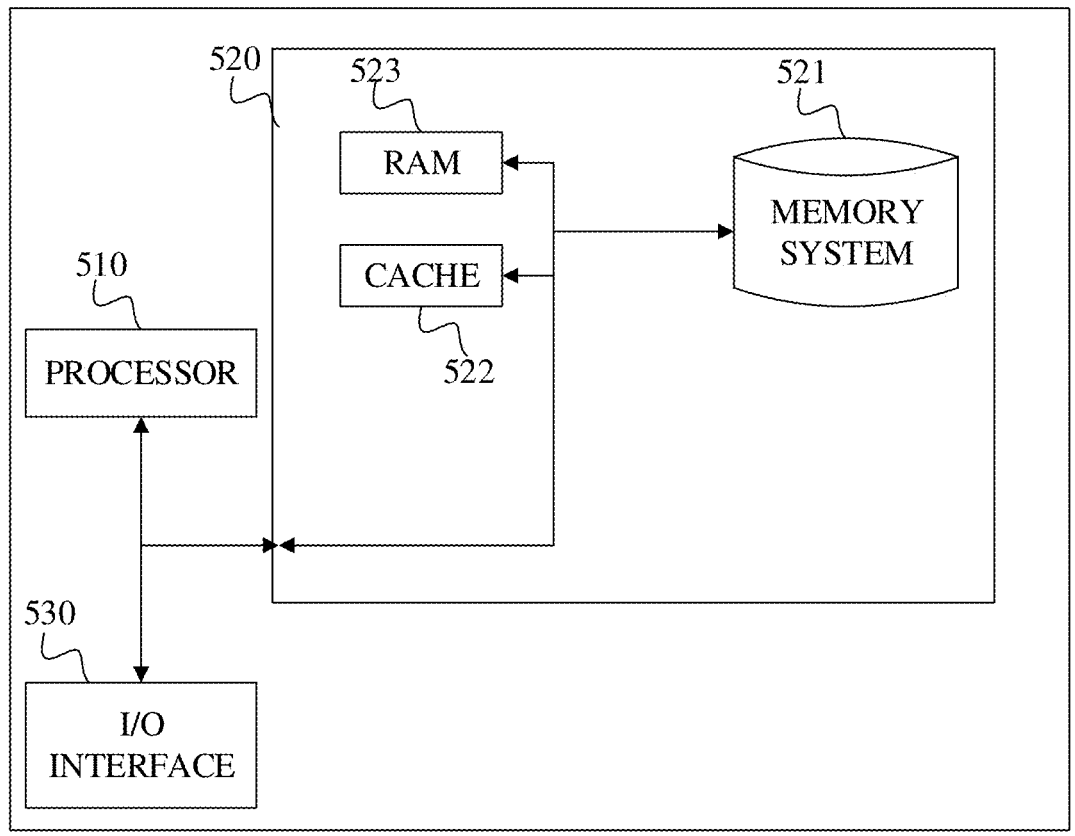
FIG. 5 is a schematic structural diagram of another user terminal provided in implementations of the disclosure.

Referring to FIG. 5, FIG. 5 is a schematic structural diagram of another user terminal provided in implementations of the disclosure. The user terminal may include a processor 510, a memory 520, an input/output (I/O) interface 530, and a bus. The processor 510, the memory 520, and the I/O interface 530 may be communicatively connected through the bus. The memory 520 is configured to store instructions. The processor 510 is configured to execute the instructions stored in the memory 520, to implement the operations in the method corresponding to FIG. 1.

The processor 510 is configured to execute the instructions stored in the memory 520, to control the I/O interface 530 to receive and transmit signals, thereby implementing the operations in the foregoing method. The memory 520 may be integrated in the processor 510, and may also be disposed separately from the processor 510.

The memory 520 may further include a memory system 521, a cache 522, and a random access memory (RAM) 523. The cache 522 is a single-level-memory existing between the RAM 523 and a central processing unit (CPU), and is consisted of a static random access memory (SRAM). The cache 522 has a small capacity but a speed much higher than that of a main memory, which is close to the speed of the CPU. The RAM 523 is an internal memory for directly exchanging data with the CPU, which can be read and written at any time (except when being refreshed) with a high speed. The RAM 523 is generally used as a temporary data storage medium of an operating system or other running programs. The function of the memory 520 is implemented with a combination of the three.

As an implementation, the function of the I/O interface 530 may be implemented by a transceiver circuit or a dedicated chip for transceiving. The processor 510 may be considered to be implemented by a dedicated processing chip, a processing circuit, a processor, or a general-purpose chip.

As another implementation, the apparatus provided in implementations of the disclosure may be implemented by a general-purpose computer. That is, program codes for implementing functions of the processor 510 and the I/O interface 530 are stored in the memory 520, and a general-purpose processor implements the functions of the processor 510 and the I/O interface 530 by executing the codes in the memory 520.

For explanations and detailed descriptions of the concepts and other operations involved in the apparatus and related to the technical solutions provided in implementations of the disclosure, reference can be made to the description of the foregoing method or the operations in the method performed by the apparatus in other implementations, which are not repeated herein.

As another implementation, a computer-readable storage medium is provided, on which instructions are stored. When the instructions are executed, the methods in the foregoing method implementation are executed.

As another implementation, a computer program product including instructions is provided, When the instructions are executed, the methods in the foregoing method implementation are executed.

Those of ordinary skill in the art can understand that only one memory and processor are illustrated in FIG. 5 for convenience of illustration. In practice, there may be multiple processors and memories in a terminal or server. The memory can also be referred to as storage medium or storage device, etc., which is not limited in implementations of the disclosure.

In implementations of the disclosure, it should be understood that the processor may be a CPU. The processor may also be a general-purpose processor, a digital signal processor (DSP), an application specific integrated circuit (ASIC), a field-programmable gate array (FPGA), or other programming logic devices, discrete gate or transistor logic devices, discrete hardware components, etc.

It should also be understood that, the memory mentioned in implementations of the disclosure may be a volatile memory or a non-volatile memory, or may include both volatile and non-volatile memory. The non-volatile memory may be a read only memory (ROM), a programmable read-only memory (PROM), an erasable programmable read-only memory (EPROM), an electrically erasable programmable read-only memory (EEPROM) or flash memory. The volatile memory may be a RAM, which is used as an external cache. By way of example, but not limitation, many forms of RAM are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct memory bus random access memory (DRRAM).

It should be noted that, when the processor is a general-purpose processor, DSP, ASIC, FPGA or other programming logic devices, discrete gate or transistor logic devices, or discrete hardware components, the memory (memory module) is integrated in the processor.

It should be noted that, the memory described herein is intended to include, but is not limited to, these and any other suitable types of memory.

In addition to a data bus, the bus may also include a power bus, a control bus, and a status signal buss. However, for the sake of clarity, the various buses are designated as a bus in figure.

It should also be understood that, the first, second, third, fourth and various serial numbers mentioned herein are distinguished merely for the convenience of description and are not intended to limit the scope of the disclosure.

It should be understood that, the term "and/or" herein merely describes an association relationship between associated objects, which means that there may be three relationships. For example, A and/or B may mean A alone, both A and B exist, and B alone. In addition, the character "/" herein generally indicates that the associated objects are in an "or" relationship.

In the implementation, each operation in the foregoing method can be completed by hardware integrated logic circuits in the processor and/or instructions in the form of software, and the operations of the method disclosed in implementations of the disclosure can be directly embodied as being completed by a hardware processor or a combination of hardware and software modules in the processor. The software modules may be located in a mature storage medium such as a random access memory, a flash memory, a read-only memory, a programmable read-only memory, or an electrically erasable programmable memory, a register, and the like. The storage medium is located in the memory. The processor reads the information in the memory, and completes the operations of the method described above with the hardware of the processor, which will not be described in detail herein to avoid repetition.

In various implementations of the disclosure, the magnitude of the sequence numbers of the above processes does not mean the order of execution. The order of execution of each process should be determined by its function and internal logic, and should not constitute any limitation to the implementation process of implementations in the disclosure.

Those of ordinary skill in the art will appreciate that, various illustrative logical blocks (ILB) and operations described in connection with implementations disclosed herein can be implemented by electronic hardware or by a combination of computer software and electronic hardware. Whether these functions are performed by means of hardware or software depends on the particular application and the design constraints of the associated technical solution. Those of ordinary skill in the art may use different methods with regard to each particular application to implement the described function, but such implementations should not be considered beyond the scope of the disclosure.

It will be appreciated that the systems, apparatuses, and methods disclosed in some implementations provided in the disclosure may also be implemented in various other manners. For example, the above apparatus implementations are merely illustrative, e.g., the division of units is merely a division of logical functions, and other manners of division may also available in practice, e.g., multiple units or assemblies may be combined or may be integrated into another system, or some features may be ignored or omitted. In other respects, the coupling or direct coupling or communication connection as illustrated or discussed may be an indirect coupling or communication connection through some interfaces, devices or units, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of implementations.

Furthermore, various functional units in various implementations of the disclosure may be integrated into one processing unit or may be present as a number of physically separated units, and two or more units may be integrated into one.

All or part of the above implementations can be implemented through software, hardware, firmware, or any other combination thereof. When implemented by software, all or part of the above implementations can be implemented in the form of a computer program product. The computer program product includes one or more computer instructions. When the computer program instructions are loaded and executed on a computer, all or part of the operations or functions described in implementations of the disclosure are generated. The computer may be a general-purpose computer, a special-purpose computer, a computer network, or other programmable apparatuses. The computer instructions may be stored in a computer-readable storage medium, or transmitted from one computer-readable storage medium to another computer-readable storage medium. For example, the computer instruction may be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer-readable storage medium can be any computer accessible usable medium or a data storage device such as a server, a data center, or the like which is integrated with one or more usable medium. The usable medium can be a magnetic medium (such as a soft disc, a hard disc, or a magnetic tape), an optical medium (such as a digital video disc (DVD)), or a semiconductor medium (such as an SSD), etc.

In implementations of the disclosure, a computer storage medium is further provided. The computer-readable storage medium is configured to store a computer program. The computer program is executed by the processor to implement part or all of the operations of any method for remotely solving thermal runaway described in the above method implementation.

In implementations of the disclosure, a computer program product is further provided. The computer program product includes a non-transitory computer-readable storage medium storing a computer program. The computer program is operable to enable the computer to execute part or all of the operations of any method for remotely solving thermal runaway described in the above method implementation.

The above are some specific implementations of the disclosure, but the protection scope of the disclosure is not limited thereto. Any changes or substitutions that can be easily conceived by those of ordinary skill in the art within the technical scope disclosed by the disclosure should be covered by the protection scope of the disclosure, and thus the protection scope of the disclosure should be subject to the protection scope of the claims.

What is claimed is:

1. A method for remotely solving thermal runaway, applied to a user terminal in a system for remotely solving thermal runaway, the system for remotely solving the thermal runaway comprising the user terminal, at least one monitoring terminal, a plurality of thermal-runaway solving devices, and at least one energy-storage device, and the method comprising:

receiving, at a preset frequency, at least one monitoring datum transmitted by the at least one monitoring terminal and related to the at least one energy-storage device;

determining an energy-storage device related to at least one of the at least one monitoring datum as a target energy-storage device, when the at least one of the at least one monitoring datum is greater than a threshold;

determining an accident type of the target energy-storage device according to the at least one of the at least one monitoring datum, generating a first prompt message, and presenting the first prompt message to a user in at least one manner, wherein the first prompt message is used for prompting existence of a potential safety hazard in the target energy-storage device and the accident type of the target energy-storage device;

determining, according to the target energy-storage device and the accident type of the target energy storage, a corresponding first preset thermal-runaway solution, and controlling, according to the first preset thermal-runaway solution, at least one first thermal-runaway solving device among the plurality of thermal-runaway solving devices to solve thermal runaway for the target energy-storage device, wherein the first thermal-runaway solving device corresponds to the target energy-storage device and the accident type of the target energy-storage device;

switching the first preset thermal-runaway solution to a second preset thermal-runaway solution, in response to a thermal-runaway solution switching instruction inputted by the user via the user terminal, and controlling, according to the second preset thermal-runaway solution, at least one second thermal-runaway solving device among the plurality of thermal-runaway solving devices to solve the thermal runaway for the target energy-storage device, wherein the second preset thermal-runaway solution is related to the thermal-runaway solution switching instruction, and the second thermal-runaway solving device corresponds to the target energy-storage device and an accident type determined by the user;

controlling, according to the first preset thermal-runaway solution and a third preset thermal-runaway solution, the at least one first thermal-runaway solving device and at least one third thermal-runaway solving device among the plurality of thermal-runaway solving devices to solve the thermal runaway for the target energy-storage device, in response to a thermal-runaway solution adding instruction inputted by the user via the user terminal, wherein the third preset thermal-runaway solution is related to the thermal-runaway solution adding instruction, and the third thermal-runaway solving device corresponds to the target energy-storage device and the accident type of the target energy-storage device, or corresponds to the accident type determined by the user; and generating a temporary thermal-runaway solution, in response to a thermal-runaway solution setting instruction inputted by the user via the user terminal, and controlling, according to the temporary thermal-runaway solution, at least one fourth thermal-runaway solving device among the plurality of thermal-runaway solving devices to solve the thermal runaway for the target energy-storage device, wherein the temporary thermal-runaway solution is related to the thermal-runaway solution setting instruction, the thermal-runaway solution setting instruction is used for setting at least one of a type, a quantity, or a position of the at least one fourth thermal-runaway solving device, and the fourth thermal-runaway solving device corresponds to the target energy-storage device and the accident type determined by the user.

2. The method of claim 1, wherein the first preset thermal-runaway solution, the second preset thermal-runaway solution, the third preset thermal-runaway solution, and the temporary thermal-runaway solution each are used for adjusting and controlling at least one of: a spraying speed of a suppression medium, a spraying duration of the suppression medium, a working duration and a rotating speed of an exhaust fan, or a laying manner of a fire-proof and explosion-proof layer, and the method further comprises:

after a thermal-runaway solution to-be-implemented is determined by the user terminal, if an implementing duration of the thermal-runaway solution implemented reaches a preset duration and the at least one of the at least one monitoring datum is currently still greater than the threshold, re-determining the accident type of the target energy-storage device according to the at least one of the at least one monitoring datum, and presenting a second prompt message to the user, wherein the second prompt message is used for prompting the user to switch the thermal-runaway solution currently implemented.

3. The method of claim 2, further comprising:

displaying, by the user terminal, a list of the at least one energy-storage device, in response to a first viewing instruction received by the user terminal; and displaying, by the user terminal, at least one first monitoring datum related to a first energy-storage device among the at least one energy-storage device, in response to a first selecting instruction received by the user terminal, wherein the first selecting instruction is used for selecting the first energy-storage device from the list.

4. The method of claim 3, after displaying, by the user terminal, the at least one first monitoring datum related to the first energy-storage device among the at least one energy-storage device, in response to the first selecting instruction received by the user terminal, the method further comprising:

switching from a monitoring terminal that monitors the first energy-storage device to another monitoring terminal that monitors the first energy-storage device, in response to a switching instruction received by the user terminal; and displaying a second monitoring datum collected from the another monitoring terminal and related to the first energy-storage device.

5. The method of claim 3, further comprising:

transmitting a parameter adjusting instruction received by the user terminal to the at least one monitoring terminal and/or at least one of the plurality of thermal-runaway solving devices, wherein the parameter adjusting instruction is used for setting the threshold and/or a thermal-runaway solving parameter of the at least one of the plurality of thermal-runaway solving devices, and the thermal-runaway solving parameter comprises a storage capacity of the suppression medium.

6. The method of claim 2, further comprising:

transmitting alarm information to the plurality of thermal-runaway solving devices, wherein the alarm information comprises position information of the target energy-storage device and the at least one of the at least one monitoring datum.

7. The method of claim 1, further comprising:

after controlling, according to a thermal-runaway solution currently determined, a corresponding thermal-runaway solving device to solve the thermal runaway for the target energy-storage device, if all thermal-runaway solving devices corresponding to the thermal-runaway solution currently determined fail, enabling another disabled thermal-runaway solving device which is of the same type as all corresponding thermal-runaway solving devices and corresponds to the target energy-storage device, wherein the thermal-runaway solution currently determined is the first preset thermal-runaway solution, the second preset thermal-runaway solution, the third preset thermal-runaway solution, or the temporary thermal-runaway solution.

8. A user terminal, comprising a processor, a memory, and a bus, wherein
the processor and the memory are connected through the bus, the memory is configured to store a set of program codes, and the processor is configured to invoke the program codes stored in the memory to execute:
receiving, at a preset frequency, at least one monitoring datum transmitted by at least one monitoring terminal and related to at least one energy-storage device;
determining an energy-storage device related to at least one of the at least one monitoring datum as a target energy-storage device, when the at least one of the at least one monitoring datum is greater than a threshold;
determining an accident type of the target energy-storage device according to the at least one of the at least one monitoring datum, generating a first prompt message, and presenting the first prompt message to a user in at least one manner, wherein the first prompt message is used for prompting existence of a potential safety hazard in the target energy-storage device and the accident type of the target energy-storage device;
determining, according to the target energy-storage device and the accident type of the target energy storage, a corresponding first preset thermal-runaway solution, and controlling, according to the first preset thermal-runaway solution, at least one first thermal-runaway solving device among a plurality of thermal-runaway solving devices to solve thermal runaway for the target energy-storage device, wherein the first thermal-runaway solving device corresponds to the target energy-storage device and the accident type of the target energy-storage device;
switching the first preset thermal-runaway solution to a second preset thermal-runaway solution, in response to a thermal-runaway solution switching instruction inputted by the user via the user terminal, and controlling, according to the second preset thermal-runaway solution, at least one second thermal-runaway solving device among the plurality of thermal-runaway solving devices to solve the thermal runaway for the target energy-storage device, wherein the second preset thermal-runaway solution is related to the thermal-runaway solution switching instruction, and the second thermal-runaway solving device corresponds to the target energy-storage device and an accident type determined by the user;
controlling, according to the first preset thermal-runaway solution and a third preset thermal-runaway solution, the at least one first thermal-runaway solving device and at least one third thermal-runaway solving device among the plurality of thermal-runaway solving devices to solve the thermal runaway for the target energy-storage device, in response to a thermal-runaway solution adding instruction inputted by the user via the user terminal, wherein the third preset thermal-runaway solution is related to the thermal-runaway solution adding instruction, and the third thermal-runaway solving device corresponds to the target energy-storage device and the accident type of the target energy-storage device, or corresponds to the accident type determined by the user; and
generating a temporary thermal-runaway solution, in response to a thermal-runaway solution setting instruction inputted by the user via the user terminal, and controlling, according to the temporary thermal-runaway solution, at least one fourth thermal-runaway solving device among the plurality of thermal-runaway solving devices to solve the thermal runaway for the target energy-storage device, wherein the temporary thermal-runaway solution is related to the thermal-runaway solution setting instruction, the thermal-runaway solution setting instruction is used for setting at least one of a type, a quantity, or a position of the at least one fourth thermal-runaway solving device, and the fourth thermal-runaway solving device corresponds to the target energy-storage device and the accident type determined by the user.

9. The user terminal of claim 8, wherein the first preset thermal-runaway solution, the second preset thermal-runaway solution, the third preset thermal-runaway solution, and the temporary thermal-runaway solution each are used for adjusting and controlling at least one of: a spraying speed of a suppression medium, a spraying duration of the suppression medium, a working duration and a rotating speed of an exhaust fan, or a laying manner of a fire-proof and explosion-proof layer, and the processor is further configured to invoke the program codes to execute:
after a thermal-runaway solution to-be-implemented is determined by the user terminal, if an implementing duration of the thermal-runaway solution implemented reaches a preset duration and the at least one of the at least one monitoring datum is currently still greater than the threshold, re-determining the accident type of the target energy-storage device according to the at least one of the at least one monitoring datum, and presenting a second prompt message to the user, wherein the second prompt message is used for prompting the user to switch the thermal-runaway solution currently implemented.

10. The user terminal of claim 9, wherein the processor is further configured to invoke the program codes to execute:
displaying, by the user terminal, a list of the at least one energy-storage device, in response to a first viewing instruction received by the user terminal; and
displaying, by the user terminal, at least one first monitoring datum related to a first energy-storage device among the at least one energy-storage device, in response to a first selecting instruction received by the user terminal, wherein the first selecting instruction is used for selecting the first energy-storage device from the list.

11. The user terminal of claim 10, wherein after displaying, by the user terminal, the at least one first monitoring datum related to the first energy-storage device among the at least one energy-storage device, in response to the first selecting instruction received by the user terminal, the processor is further configured to invoke the program codes to execute:
switching from a monitoring terminal that monitors the first energy-storage device to another monitoring terminal that monitors the first energy-storage device, in response to a switching instruction received by the user terminal; and displaying a second monitoring datum collected from the another monitoring terminal and related to the first energy-storage device.

12. The user terminal of claim 10, wherein the processor is further configured to invoke the program codes to execute:
transmitting a parameter adjusting instruction received by the user terminal to the at least one monitoring terminal and/or at least one of the plurality of thermal-runaway solving devices, wherein the parameter adjusting instruction is used for setting the threshold and/or a thermal-runaway solving parameter of the at least one of the plurality of thermal-runaway solving devices, and the thermal-runaway solving parameter comprises a storage capacity of the suppression medium.

13. The user terminal of claim 9, wherein the processor is further configured to invoke the program codes to execute:
transmitting alarm information to the plurality of thermal-runaway solving devices, wherein the alarm information comprises position information of the target energy-storage device and the at least one of the at least one monitoring datum.

14. The user terminal of claim 8, wherein the processor is further configured to invoke the program codes to execute:
after controlling, according to a thermal-runaway solution currently determined, a corresponding thermal-runaway solving device to solve the thermal runaway for the target energy-storage device, if all thermal-runaway solving devices corresponding to the thermal-runaway solution currently determined fail, enabling another disabled thermal-runaway solving device which is of the same type as all corresponding thermal-runaway solving devices and corresponds to the target energy-storage device, wherein the thermal-runaway solution currently determined is the first preset thermal-runaway solution, the second preset thermal-runaway solution, the third preset thermal-runaway solution, or the temporary thermal-runaway solution.

15. A computer-readable storage medium storing instructions which, when executed by a computer, implement:
receiving, at a preset frequency, at least one monitoring datum transmitted by at least one monitoring terminal and related to at least one energy-storage device;
determining an energy-storage device related to at least one of the at least one monitoring datum as a target energy-storage device, when the at least one of the at least one monitoring datum is greater than a threshold;
determining an accident type of the target energy-storage device according to the at least one of the at least one monitoring datum, generating a first prompt message, and presenting the first prompt message to a user in at least one manner, wherein the first prompt message is used for prompting existence of a potential safety hazard in the target energy-storage device and the accident type of the target energy-storage device;
determining, according to the target energy-storage device and the accident type of the target energy storage, a corresponding first preset thermal-runaway solution, and controlling, according to the first preset thermal-runaway solution, at least one first thermal-runaway solving device among a plurality of thermal-runaway solving devices to solve thermal runaway for the target energy-storage device, wherein the first thermal-runaway solving device corresponds to the target energy-storage device and the accident type of the target energy-storage device;
switching the first preset thermal-runaway solution to a second preset thermal-runaway solution, in response to a thermal-runaway solution switching instruction inputted by the user via a user terminal, and controlling, according to the second preset thermal-runaway solution, at least one second thermal-runaway solving device among the plurality of thermal-runaway solving devices to solve the thermal runaway for the target energy-storage device, wherein the second preset thermal-runaway solution is related to the thermal-runaway solution switching instruction, and the second thermal-runaway solving device corresponds to the target energy-storage device and an accident type determined by the user;
controlling, according to the first preset thermal-runaway solution and a third preset thermal-runaway solution, the at least one first thermal-runaway solving device and at least one third thermal-runaway solving device among the plurality of thermal-runaway solving devices to solve the thermal runaway for the target energy-storage device, in response to a thermal-runaway solution adding instruction inputted by the user via the user terminal, wherein the third preset thermal-runaway solution is related to the thermal-runaway solution adding instruction, and the third thermal-runaway solving device corresponds to the target energy-storage device and the accident type of the target energy-storage device, or corresponds to the accident type determined by the user; and
generating a temporary thermal-runaway solution, in response to a thermal-runaway solution setting instruction inputted by the user via the user terminal, and controlling, according to the temporary thermal-runaway solution, at least one fourth thermal-runaway solving device among the plurality of thermal-runaway solving devices to solve the thermal runaway for the target energy-storage device, wherein the temporary thermal-runaway solution is related to the thermal-runaway solution setting instruction, the thermal-runaway solution setting instruction is used for setting at least one of a type, a quantity, or a position of the at least one fourth thermal-runaway solving device, and the fourth thermal-runaway solving device corresponds to the target energy-storage device and the accident type determined by the user.

16. The computer-readable storage medium of claim 15, wherein the first preset thermal-runaway solution, the second preset thermal-runaway solution, the third preset thermal-runaway solution, and the temporary thermal-runaway solution each are used for adjusting and controlling at least one of: a spraying speed of a suppression medium, a spraying duration of the suppression medium, a working duration and a rotating speed of an exhaust fan, or a laying manner of a fire-proof and explosion-proof layer, and the instructions when executed by the user terminal further implement:
after a thermal-runaway solution to-be-implemented is determined by the user terminal, if an implementing duration of the thermal-runaway solution implemented reaches a preset duration and the at least one of the at least one monitoring datum is currently still greater than the threshold, re-determining the accident type of the target energy-storage device according to the at least one of the at least one monitoring datum, and presenting a second prompt message to the user, wherein the second prompt message is used for prompting the user to switch the thermal-runaway solution currently implemented.

17. The computer-readable storage medium of claim 16, wherein the instructions when executed by the user terminal further implement:
  displaying, by the user terminal, a list of the at least one energy-storage device, in response to a first viewing instruction received by the user terminal; and
  displaying, by the user terminal, at least one first monitoring datum related to a first energy-storage device among the at least one energy-storage device, in response to a first selecting instruction received by the user terminal, wherein the first selecting instruction is used for selecting the first energy-storage device from the list.

18. The computer-readable storage medium of claim 17, wherein after displaying, by the user terminal, the at least one first monitoring datum related to the first energy-storage device among the at least one energy-storage device, in response to the first selecting instruction received by the user terminal, the instructions when executed by the user terminal further implement:
  switching from a monitoring terminal that monitors the first energy-storage device to another monitoring terminal that monitors the first energy-storage device, in response to a switching instruction received by the user terminal; and
  displaying a second monitoring datum collected from the another monitoring terminal and related to the first energy-storage device.

19. The computer-readable storage medium of claim 17, wherein the instructions when executed by the user terminal further implement:
  transmitting a parameter adjusting instruction received by the user terminal to the at least one monitoring terminal and/or at least one of the plurality of thermal-runaway solving devices, wherein the parameter adjusting instruction is used for setting the threshold and/or a thermal-runaway solving parameter of the at least one of the plurality of thermal-runaway solving devices, and the thermal-runaway solving parameter comprises a storage capacity of the suppression medium.

20. The computer-readable storage medium of claim 16, wherein the instructions when executed by the user terminal further implement:
  transmitting alarm information to the plurality of thermal-runaway solving devices, wherein the alarm information comprises position information of the target energy-storage device and the at least one of the at least one monitoring datum.

\* \* \* \* \*